(12) United States Patent
Shih et al.

(10) Patent No.: US 9,927,595 B2
(45) Date of Patent: Mar. 27, 2018

(54) LENS ASSEMBLY

(71) Applicants: Sintai Optical (Shenzhen) Co., Ltd., Shenzhen, Guandong Province (TW); Asia Optical International Ltd., Tortola (GB)

(72) Inventors: Po-Yuan Shih, Taichung (TW); Hsi-Ling Chang, Taichung (TW); Chien-Hung Chen, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 78 days.

(21) Appl. No.: 14/619,101

(22) Filed: Feb. 11, 2015

(65) Prior Publication Data

US 2015/0241661 A1    Aug. 27, 2015

(30) Foreign Application Priority Data

Feb. 26, 2014   (TW) ............................ 103106433 A
Apr. 8, 2014    (TW) ............................ 103112837 A

(51) Int. Cl.
  *G02B 3/02*      (2006.01)
  *G02B 13/18*     (2006.01)
  (Continued)

(52) U.S. Cl.
  CPC ............ *G02B 13/0045* (2013.01); *G02B 9/60* (2013.01)

(58) Field of Classification Search
  CPC ..... G02B 15/173; G02B 13/0045; G02B 9/64
  (Continued)

(56) References Cited

U.S. PATENT DOCUMENTS 8,786,963 B2   7/2014  Tamura
8,896,936 B2   11/2014 Tsai et al.
(Continued)

FOREIGN PATENT DOCUMENTS

CN   103293635 A   9/2013
CN   104007536 A   8/2014
(Continued)

OTHER PUBLICATIONS

English Abstract translation of CN103293635 (Published Sep. 11, 2013).

*Primary Examiner* — Mahidere Sahle
(74) *Attorney, Agent, or Firm* — McClure, Qualey & Rodack, LLP

(57) ABSTRACT

A lens assembly includes a first lens, a second lens, a third lens, a fourth lens and a fifth lens. The first lens is with positive refractive power. The second lens is with negative refractive power. The third lens is with positive refractive power. The fourth lens is a meniscus lens and includes a concave surface facing the object side and a convex surface facing the image side. The fifth lens includes a concave surface facing the image side. The first lens and the third lens are made of the same material and an Abbe number of the first lens is the same as an Abbe number of the third lens. An Abbe number of the first lens, an Abbe number of the third lens and an Abbe number of the fifth lens are greater than an Abbe number of the second lens.

17 Claims, 28 Drawing Sheets

(51) Int. Cl.
*G02B 13/00* (2006.01)
*G02B 9/60* (2006.01)

(58) Field of Classification Search
USPC .................................. 359/676–706, 822–826
See application file for complete search history.

(56) References Cited

U.S. PATENT DOCUMENTS

| | | | | |
|---|---|---|---|---|
| 2011/0038055 | A1* | 2/2011 | Nurishi | G02B 15/173 359/687 |
| 2013/0329307 | A1* | 12/2013 | Jung | G02B 13/0045 359/714 |
| 2014/0368928 | A1* | 12/2014 | Jo | G02B 9/60 359/714 |
| 2015/0002942 | A1* | 1/2015 | Chen | G02B 13/0045 359/664 |

FOREIGN PATENT DOCUMENTS

| | | |
|---|---|---|
| JP | 2014163970 A | 9/2014 |
| TW | 201331618 | 8/2013 |
| TW | 201333522 | 8/2013 |
| WO | 2014155468 A1 | 10/2014 |

\* cited by examiner

LENS ASSEMBLY

BACKGROUND OF THE INVENTION

Field of the Invention

The invention relates to a lens assembly.

Description of the Related Art

Digital still cameras and mobile phones have been gradually developed toward high pixel number and miniaturization. Therefore, the requirements for lens assemblies with miniaturization and high resolution are greatly increased. The well-known lens assembly with five lenses usually uses one lens with low Abbe number and four lenses with high Abbe number in order to meet the requirements of miniaturization and high resolution. But, it is not perfect and still needs improvement. Therefore, a lens assembly needs a new structure in order to meet the requirement of the present.

BRIEF SUMMARY OF THE INVENTION

The invention provides a lens assembly to solve the above problems. The lens assembly of the invention, provided with characteristics of a shortened total lens length, still has a good optical performance and can meet a requirement of resolution.

The lens assembly in accordance with an exemplary embodiment of the invention includes a first lens, a second lens, a third lens, a fourth lens and a fifth lens, all of which are arranged in sequence from an object side to an image side along an optical axis. The first lens is with positive refractive power. The second lens is with negative refractive power. The third lens is with positive refractive power. The fourth lens is a meniscus lens and includes a concave surface facing the object side and a convex surface facing the image side. The fifth lens includes a concave surface facing the image side. The first lens and the third lens are made of the same material and an Abbe number of the first lens is the same as an Abbe number of the third lens. An Abbe number of the first lens, an Abbe number of the third lens and an Abbe number of the fifth lens are greater than an Abbe number of the second lens.

In another exemplary embodiment, the fourth lens is with negative refractive power and the fifth lens is with positive refractive power.

In yet another exemplary embodiment, the first lens, the third lens and the fifth lens are made of the same material and an Abbe number of the first lens, an Abbe number of the third lens and an Abbe number of the fifth lens are the same; an Abbe number of the first lens, an Abbe number of the third lens and an Abbe number of the fifth lens are greater than an Abbe number of the second lens and an Abbe number of the fourth lens; and the second lens and the fourth lens are made of the same material and an Abbe number of the second lens is the same as an Abbe number of the fourth lens.

In another exemplary embodiment, the first lens, the second lens, the third lens, the fourth lens and the fifth lens are made of plastic material.

In yet another exemplary embodiment, the lens assembly further includes a stop disposed between the object side and the first lens, or disposed between the first lens and the second lens.

In another exemplary embodiment, the first lens includes two surfaces, at least one of which is an aspheric surface or both of which are aspheric surfaces; the second lens includes two surfaces, at least one of which is an aspheric surface or both of which are aspheric surfaces; the third lens includes two surfaces, at least one of which is an aspheric surface or both of which are aspheric surfaces; the fourth lens includes two surfaces, at least one of which is an aspheric surface or both of which are aspheric surfaces; and the fifth lens further includes a surface, wherein the surface is an aspheric surface, or the concave surface of the fifth lens is an aspheric surface, or both of the surface and the concave surface of the fifth lens are aspheric surfaces.

In yet another exemplary embodiment, the first lens and the second lens satisfy $-2.5 \leq (R_{11}-R_{12})/(R_{11}+R_{12}) \leq -1.9$, $0.4 \leq (R_{21}-R_{22})/(R_{21}+R_{22}) \leq 0.5$ wherein $R_{11}$ is a radius of curvature of an object side surface of the first lens, $R_{12}$ is a radius of curvature of an image side surface of the first lens, $R_{21}$ is a radius of curvature of an object side surface of the second lens and $R_{22}$ is a radius of curvature of an image side surface of the second lens.

In another exemplary embodiment, the second lens and the third lens satisfy $0.4 \leq (R_{21}-R_{22})/(R_{21}+R_{22}) \leq 0.5$, $-14.0 \leq (R_{31}-R_{32})/(R_{31}+R_{32}) \leq -2.4$ wherein $R_{21}$ is a radius of curvature of an object side surface of the second lens, $R_{22}$ is a radius of curvature of an image side surface of the second lens, $R_{31}$ is a radius of curvature of an object side surface of the third lens and $R_{32}$ is a radius of curvature of an image side surface of the third lens.

In yet another exemplary embodiment, the first lens and the third lens satisfy $-2.5 \leq (R_{11}-R_{12})/(R_{11}+R_{12}) \leq -1.9$, $-14.0 \leq (R_{31}-R_{32})/(R_{31}+R_{32}) \leq -2.4$ wherein $R_{11}$ is a radius of curvature of an object side surface of the first lens, $R_{12}$ is a radius of curvature of an image side surface of the first lens, $R_{31}$ is a radius of curvature of an object side surface of the third lens and $R_{32}$ is a radius of curvature of an image side surface of the third lens.

In another exemplary embodiment, the second lens and the third lens satisfy $-1.2 \leq f_2/f \leq -1.0$, $2.2 \leq f_3/f \leq 2.7$ wherein $f_2$ is an effective focal length of the second lens, f is an effective focal length of the lens assembly and $f_3$ is an effective focal length of the third lens.

In yet another exemplary embodiment, the third lens and the fourth lens satisfy $2.2 \leq f_3/f \leq 2.7$, $0.65 \leq f_4/f \leq 0.7$ wherein $f_3$ is an effective focal length of the third lens, f is an effective focal length of the lens assembly and $f_4$ is an effective focal length of the fourth lens.

In another exemplary embodiment, the fourth lens and the second lens satisfy $0.65 \leq f_4/f \leq 0.7$, $-1.2 \leq f_2/f \leq -1.0$ wherein $f_4$ is an effective focal length of the fourth lens, f is an effective focal length of the lens assembly and $f_2$ is an effective focal length of the second lens.

In yet another exemplary embodiment, the lens assembly satisfies $0.73 \leq f/TTL \leq 0.80$ wherein f is an effective focal length of the lens assembly and TTL is a distance from an object side surface of the first lens to an image plane along the optical axis.

In another exemplary embodiment, the first lens is a biconvex lens and includes a convex surface facing the object side and a convex surface facing the image side; the second lens is a meniscus lens and includes a convex surface facing the object side and a concave surface facing the image side; the third lens is a biconvex lens and includes a convex surface facing the object side and a convex surface facing the image side; the fourth lens is a meniscus lens with positive refractive power and includes a concave surface facing the object side and a convex surface facing the image side; and the fifth lens is with negative refractive power.

In yet another exemplary embodiment, the first lens satisfies $-2.5 \leq (R_{11}-R_{12})/(R_{11}+R_{12}) \leq -1.9$ wherein $R_{11}$ is a radius of curvature of the convex surface of the object side of the first lens and $R_{12}$ is a radius of curvature of the convex surface of the image side of the first lens.

In another exemplary embodiment, the second lens satisfies $0.4 \leq (R_{21}-R_{22})/(R_{21}+R_{22}) \leq 0.5$ wherein $R_{21}$ is a radius of curvature of the convex surface of the object side of the second lens and $R_{22}$ is a radius of curvature of the concave surface of the image side of the second lens.

In yet another exemplary embodiment, the second lens satisfies $-1.2 \leq f_2/f \leq -1.0$ wherein $f_2$ is an effective focal length of the second lens and f is an effective focal length of the lens assembly.

In another exemplary embodiment, the third lens satisfies $-14.0 \leq (R_{31}-R_{32})/(R_{31}+R_{32}) \leq -2.4$ wherein $R_{31}$ is a radius of curvature of the convex surface of the object side of the third lens and $R_{32}$ is a radius of curvature of the convex surface of the image side of the third lens.

In yet another exemplary embodiment, the third lens satisfies $2.2 \leq f_3/f \leq 2.7$ wherein $f_3$ is an effective focal length of the third lens and f is an effective focal length of the lens assembly.

In another exemplary embodiment, the fourth lens satisfies $0.65 \leq f_4/f \leq 0.7$ wherein $f_4$ is an effective focal length of the fourth lens and f is an effective focal length of the lens assembly.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
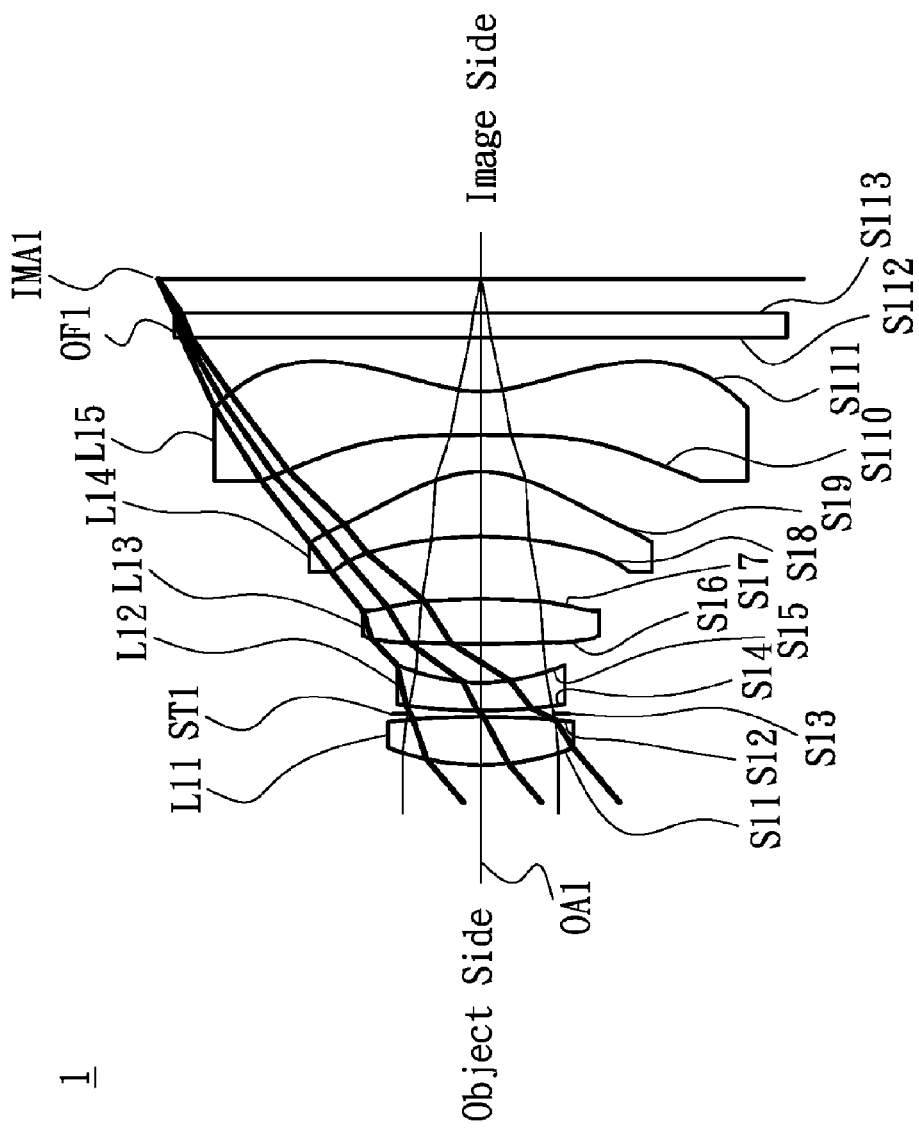
FIG. 1 is a lens layout and optical path diagram of a lens assembly in accordance with a first embodiment of the invention.

Referring to FIG. 1, FIG. 1 is a lens layout and optical path diagram of a lens assembly in accordance with a first embodiment of the invention. The lens assembly 1 includes a first lens L11, a stop ST1, a second lens L12, a third lens L13, a fourth lens L14, a fifth lens L15 and an Optical filter OF1, all of which are arranged in sequence from an object side to an image side along an optical axis OA1. In operation, an image of light rays from the object side is formed at an image plane IMA1. The first lens L11 is made of plastic material and with positive refractive power, wherein the object side surface S11 is a convex surface, the image side surface S12 is a convex surface and both of the object side surface S11 and image side surface S12 are aspheric surfaces. The second lens L12 is made of plastic material and with negative refractive power, wherein the object side surface S14 is a convex surface, the image side surface S15 is a concave surface and both of the object side surface S14 and image side surface S15 are aspheric surfaces. The third lens L13 is made of plastic material and with positive refractive power, wherein the object side surface S16 is a convex surface, the image side surface S17 is a convex surface and both of the object side surface S16 and image side surface S17 are aspheric surfaces. The fourth lens L14 is made of plastic material and with positive refractive power, wherein the object side surface S18 is a concave surface, the image side surface S19 is a convex surface and both of the object side surface S18 and image side surface S19 are aspheric surfaces. The fifth lens L15 is made of plastic material and with negative refractive power, wherein around the optical axis OA1 of the object side surface S110 is a concave surface, around the optical axis OA1 of the image side surface S111 is a concave surface and both of the object side surface S110 and image side surface S111 are aspheric surfaces. Both of the object side surface S112 and image side surface S113 of the optical filter OF1 are plane surfaces. The first lens L11 and the third lens L13 are made of the same material and with the same Abbe number. The Abbe number of the first lens L11, the third lens L13 and the fifth lens L15 are greater than the Abbe number of the second lens L12.

In order to maintain excellent optical performance of the lens assembly in accordance with the first embodiment of the invention, the lens assembly 1 must satisfies the following seven conditions:

$$0.73 \leq f1/TTL1 \leq 0.80 \quad (1)$$

$$-2.5 \leq (R1_{11}-R1_{12})/(R1_{11}+R1_{12}) \leq -1.9 \quad (2)$$

$$0.4 \leq (R1_{21}-R1_{22})/(R1_{21}+R1_{22}) \leq 0.5 \quad (3)$$

$$-1.2 \leq f1_2/f1 \leq -1.0 \quad (4)$$

$$-14.0 \leq (R1_{31}-R1_{32})/(R1_{31}+R1_{32}) \leq -2.4 \quad (5)$$

$$2.2 \leq f1_3/f1 \leq 2.7 \quad (6)$$

$$0.65 \leq f1_4/f1 \leq 0.70 \quad (7)$$

wherein f1 is an effective focal length of the lens assembly 1, TTL1 is a distance from the object side surface S11 of the first lens L11 to the image plane IMA1 along the optical axis OA1, $R1_{11}$ is a radius of curvature of the object side surface S11 of the first lens L11, $R1_{12}$ is a radius of curvature of the image side surface S12 of the first lens L11, $R1_{21}$ is a radius of curvature of the object side surface S14 of the second lens L12, $R1_{22}$ is a radius of curvature of the image side surface S15 of the second lens L12, $f1_2$ is an effective focal length of the second lens L12, $R1_{31}$ is a radius of curvature of the object side surface S16 of the third lens L13, $R1_{32}$ is a radius of curvature of the image side surface S17 of the third lens L13, $f1_3$ is an effective focal length of the third lens L13, and $f1_4$ is an effective focal length of the fourth lens L14.

By the above design of the lenses and stop ST1, the lens assembly 1 is provided with a shortened total lens length, an effective corrected aberration and an increased resolution.

In order to achieve the above purposes and effectively enhance the optical performance, the lens assembly 1 in accordance with the first embodiment of the invention is provided with the optical specifications shown in Table 1, which include the effective focal length, F-number, field of view, total lens length, radius of curvature of each lens surface, thickness between adjacent surface, refractive index of each lens and Abbe number of each lens. Table 1 shows that the effective focal length is equal to 2.667 mm, F-number is equal to 2.4, field of view is equal to 80.20° and total lens length is equal to 3.500 mm for the lens assembly 1 of the first embodiment of the invention.

TABLE 1

| Effective Focal Length = 2.667 mm F-number = 2.4 Field of View = 80.20° Total Lens Length = 3.500 mm | | | | | |
|---|---|---|---|---|---|
| Surface Number | Radius of Curvature (mm) | Thickness (mm) | Nd | Vd | Remark |
| S11 | 1.67161 | 0.350 | 1.544 | 56.1 | The First Lens L11 |
| S12 | −4.18918 | 0.020 | | | |
| S13 | ∞ | 0.022 | | | Stop ST1 |
| S14 | 2.99021 | 0.200 | 1.636 | 23.9 | The Second Lens L12 |
| S15 | 1.14049 | 0.281 | | | |
| S16 | 6.14331 | 0.324 | 1.544 | 56.1 | The Third Lens L13 |
| S17 | −7.09446 | 0.452 | | | |
| S18 | −2.93867 | 0.463 | 1.544 | 56.1 | The Fourth Lens L14 |
| S19 | −0.78418 | 0.267 | | | |
| S110 | −25.32207 | 0.311 | 1.582 | 30.2 | The Fifth Lens L15 |
| S111 | 0.89747 | 0.389 | | | |
| S112 | ∞ | 0.175 | 1.517 | 64.2 | Optical Filter OF1 |
| S113 | ∞ | 0.247 | | | |

The aspheric surface sag z of each lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each surface are shown in Table 2.

TABLE 2

| Surface Number | k | A | B | C | D | E | F | G |
|---|---|---|---|---|---|---|---|---|
| S11 | −4.47386E−01 | −1.81007E−02 | −8.75315E−02 | 2.09152E−01 | −2.67436E−02 | −1.04099E+00 | 6.56942E−01 | 4.06723E−01 |
| S12 | −1.29378E+01 | 1.15721E−01 | 4.98721E−02 | −5.78101E−01 | 3.27185E−01 | 0.00000E+00 | 0.00000E+00 | 0.00000E+00 |
| S14 | −7.33678E+01 | 2.59760E−02 | 6.12836E−01 | −2.17969E+00 | 2.05772E+00 | −2.67839E−01 | 0.00000E+00 | 0.00000E+00 |
| S15 | −7.12174E+00 | 3.52610E−02 | 5.09954E−01 | −1.28842E+00 | 5.34086E−01 | 1.52614E+00 | −2.08532E+00 | 7.23775E−01 |
| S16 | −6.38542E+01 | −1.49299E−01 | 1.37209E−01 | −5.92824E−02 | 2.37729E−01 | 5.34039E−01 | −5.09840E−01 | −8.11985E−02 |
| S17 | 2.34986E+01 | −1.34187E−01 | 7.55583E−03 | −1.69081E−01 | 2.02289E−01 | 3.95223E−01 | −4.82523E−01 | 5.57866E−01 |
| S18 | 0.00000E+00 | −4.12691E−03 | −1.07456E−02 | 6.72570E−02 | −1.46952E−01 | −4.32319E−03 | 6.85119E−02 | −1.24249E−02 |
| S19 | −3.83778E+00 | −1.69448E−01 | 2.88583E−01 | −1.55290E−01 | 4.62430E−02 | 2.19213E−02 | −1.71177E−03 | −2.93449E−03 |
| S110 | 7.36028E+01 | −1.28266E−01 | 3.70620E−02 | 2.07132E−03 | −1.44238E−03 | −3.11310E−05 | 5.57874E−05 | −1.94870E−05 |
| S111 | −6.80767E+00 | −1.16831E−01 | 5.03710E−02 | −1.73617E−02 | 2.65320E−03 | −1.40744E−04 | −2.14154E−06 | 1.17604E−06 |

For the lens assembly 1 of the first embodiment, the Abbe number of the first lens L11 and the third lens L13 are equal to 56.1, the Abbe number of the fifth lens L15 is equal to 30.2, the Abbe number of the second lens L12 is equal to 23.9, the effective focal length f1 of the lens assembly 1 is equal to 2.667 mm, the distance TTL1 from the object side surface S11 of the first lens L11 to the image plane IMA1 along the optical axis OA1 is equal to 3.500 mm, the radius of curvature $R1_{11}$ of the object side surface S11 of the first lens L11 is equal to 1.67161 mm, the radius of curvature $R1_{12}$ of the image side surface S12 of the first lens L11 is equal to −4.18918 mm, the radius of curvature $R1_{21}$ of the object side surface S14 of the second lens L12 is equal to 2.99021 mm, the radius of curvature $R1_{22}$ of the image side surface S15 of the second lens L12 is equal to 1.14049 mm, the effective focal length $f1_2$ of the second lens L12 is equal to −3.00666 mm, the radius of curvature $R1_{31}$ of the object side surface S16 of the third lens L13 is equal to 6.14331 mm, the radius of curvature $R1_{32}$ of the image side surface S17 of the third lens L13 is equal to −7.09446 mm, the effective focal length $f1_3$ of the third lens L13 is equal to 6.08317 mm, and the effective focal length $f1_4$ of the fourth lens L14 is equal to 1.82098 mm. According to the above data, the following values can be obtained:

$$f1/TTL=1=0.7619,$$

$$(R1_{11}-R1_{12})/(R1_{11}+R1_{12})=-2.3279,$$

$$(R1_{21}-R1_{22})/(R1_{21}+R1_{22})=0.4478,$$

$$f1_2/f1=-1.1275,$$

$$(R1_{31}-R1_{32})/(R1_{31}+R1_{32})=-13.9177,$$

$$f1_3/f1=2.2811,$$

$$f1_4/f1=0.6828$$

which respectively satisfy the above conditions (1)-(7).

Figure 2A:
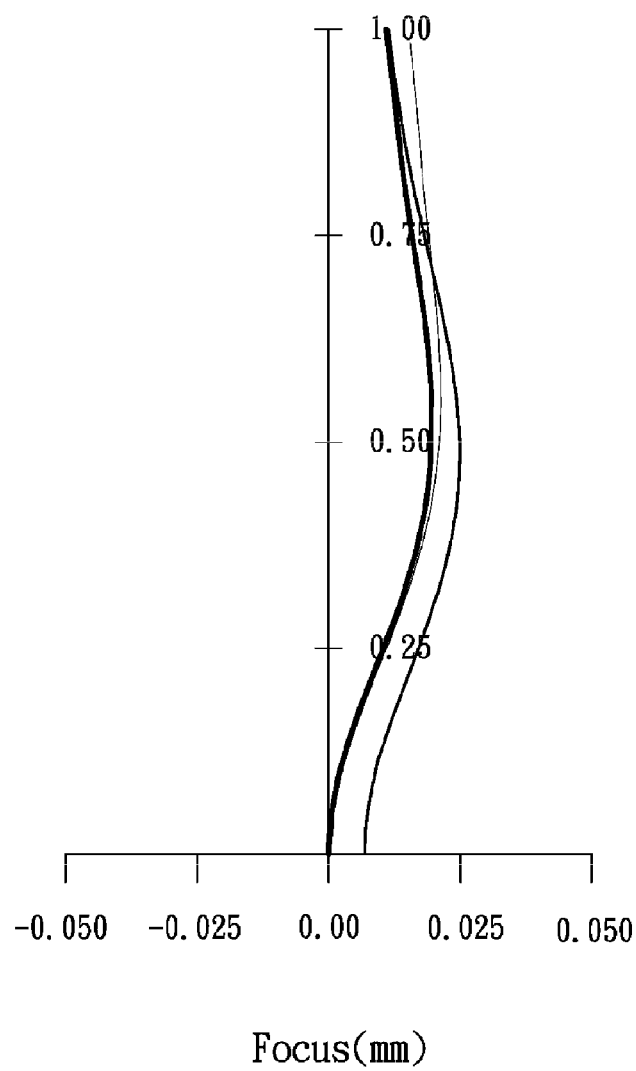
FIG. 2A depicts a longitudinal spherical aberration of the lens assembly in accordance with the first embodiment of the invention.
Figure 2B:
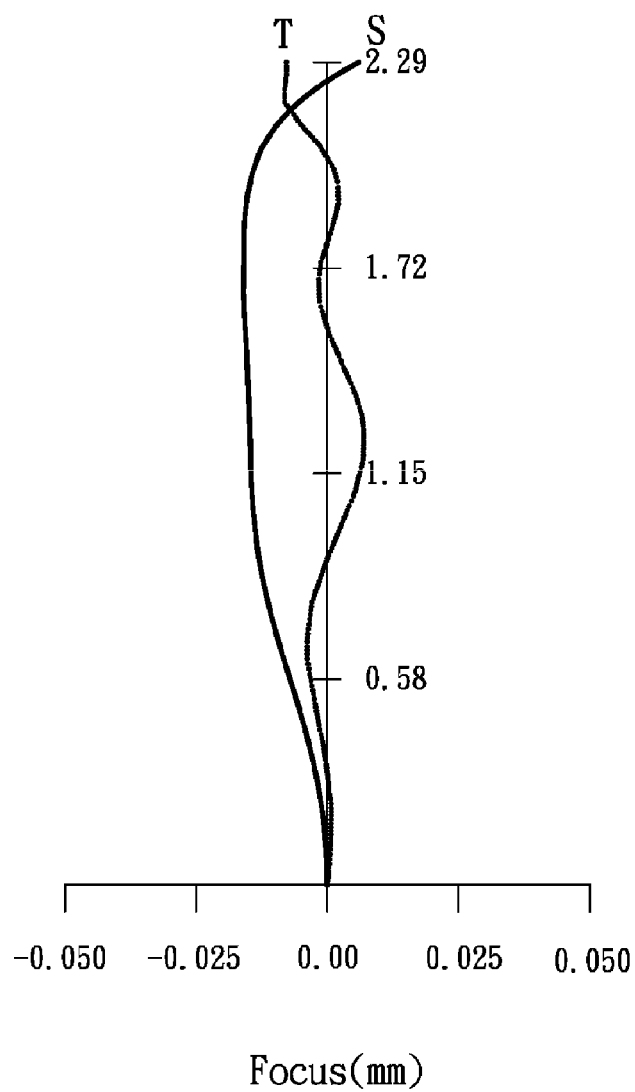
FIG. 2B is an astigmatic field curves diagram of the lens assembly in accordance with the first embodiment of the invention.
Figure 2C:
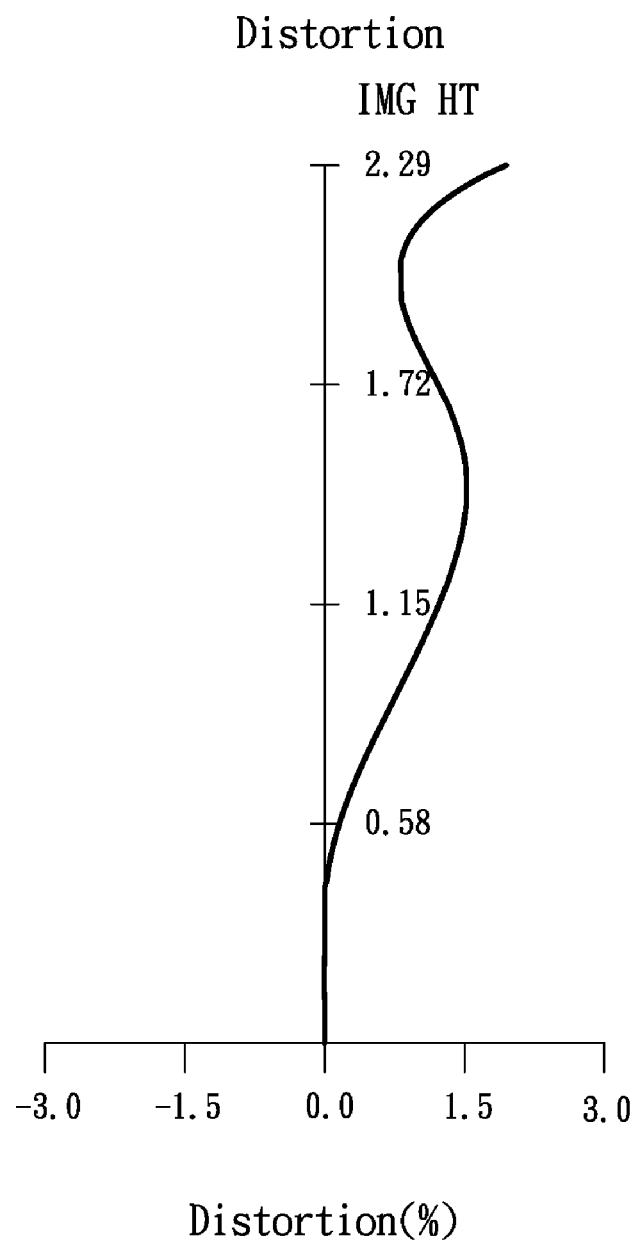
FIG. 2C is a distortion diagram of the lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows a longitudinal spherical aberration diagram of the lens assembly 1 in accordance with the first embodiment of the invention, FIG. 2B shows an astigmatic field curves of the lens assembly 1 in accordance with the first embodiment of the invention and FIG. 2C shows a distortion diagram of the lens assembly 1 in accordance with the first embodiment of the invention.

It can be seen from FIG. 2A that the longitudinal spherical aberration in the lens assembly 1 of the first embodiment ranges between 0.000 mm and 0.025 mm for the wavelength of 470.0000 nm, 555.0000 nm and 650.0000 nm. It can be seen from FIG. 2B that the astigmatic field curves of tangential direction and sagittal direction in the lens assembly 1 of the first embodiment ranges between −0.025 mm and 0.0125 mm for the wavelength of 555.0000 nm. It can be seen from FIG. 2C that the distortion in the lens assembly 1 of the first embodiment ranges between 0% and 2.0% for the wavelength of 555.0000 nm. It is obvious that the longitudinal spherical aberration, the astigmatic field curves and the distortion of the lens assembly 1 of the first embodiment can be corrected effectively. Therefore, the lens assembly 1 of the first embodiment is capable of good optical performance.

Figure 3:
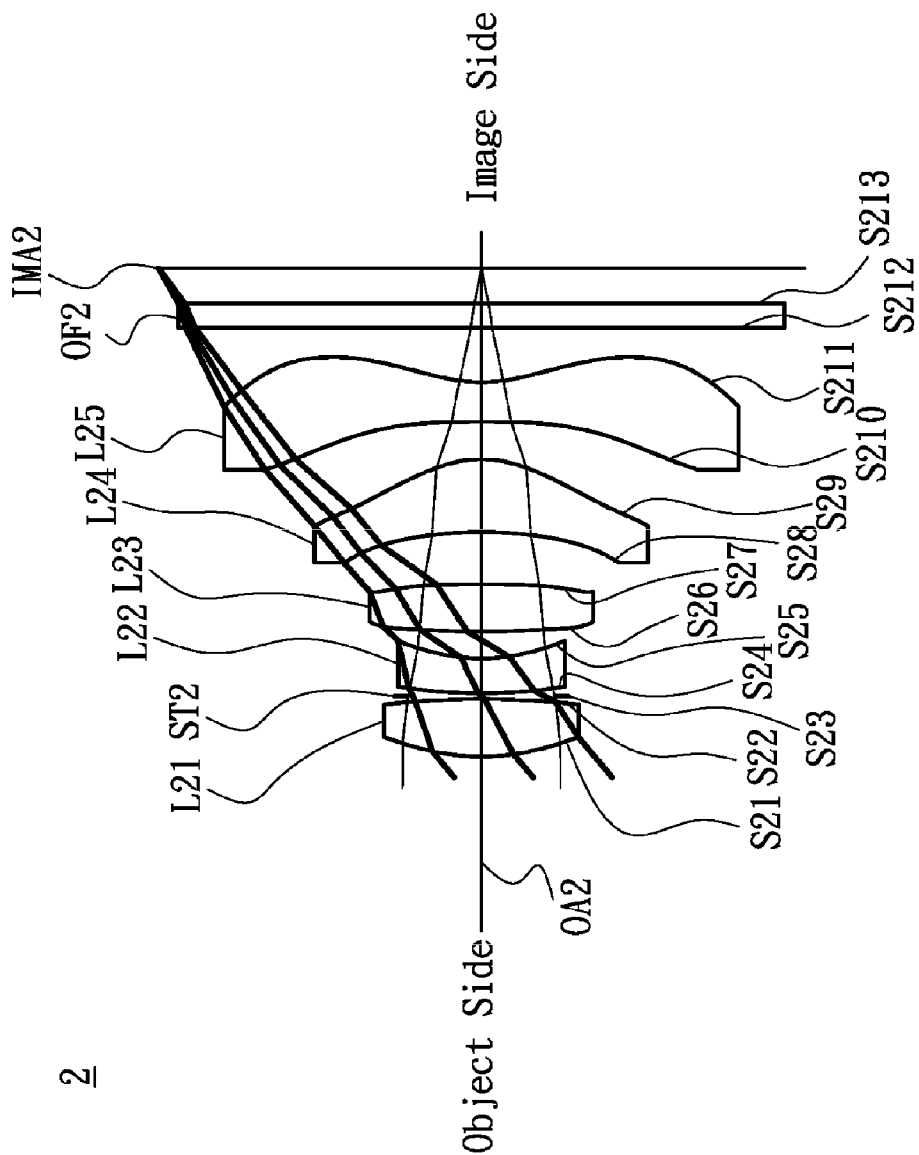
FIG. 3 is a lens layout and optical path diagram of a lens assembly in accordance with a second embodiment of the invention.

Referring to FIG. 3, FIG. 3 is a lens layout and optical path diagram of a lens assembly in accordance with a second embodiment of the invention. The lens assembly 2 includes a first lens L21, a stop ST2, a second lens L22, a third lens L23, a fourth lens L24, a fifth lens L25 and an Optical filter OF2, all of which are arranged in sequence from an object side to an image side along an optical axis OA2. In operation, an image of light rays from the object side is formed at an image plane IMA2. The first lens L21 is made of plastic material and with positive refractive power, wherein the object side surface S21 is a convex surface, the image side surface S22 is a convex surface and both of the object side surface S21 and image side surface S22 are aspheric surfaces. The second lens L22 is made of plastic material and with negative refractive power, wherein the object side surface S24 is a convex surface, the image side surface S25 is a concave surface and both of the object side surface S24 and image side surface S25 are aspheric surfaces. The third lens L23 is made of plastic material and with positive refractive power, wherein the object side surface S26 is a convex surface, the image side surface S27 is a convex surface and both of the object side surface S26 and image side surface S27 are aspheric surfaces. The fourth lens L24 is made of plastic material and with positive refractive power, wherein the object side surface S28 is a concave surface, the image side surface S29 is a convex surface and both of the object side surface S28 and image side surface S29 are aspheric surfaces. The fifth lens L25 is made of plastic material and with negative refractive power, wherein around the optical axis OA2 of the object side surface S210 is a concave surface, around the optical axis OA2 of the image side surface S211 is a concave surface and both of the object side surface S210 and image side surface S211 are aspheric surfaces. Both of the object side surface S212 and image side surface S213 of the optical filter OF2 are plane surfaces. The first lens L21 and the third lens L23 are made of the same material and with the same Abbe number. The Abbe number of the first lens L21, the third lens L23 and the fifth lens L25 are greater than the Abbe number of the second lens L22.

In order to maintain excellent optical performance of the lens assembly in accordance with the second embodiment of the invention, the lens assembly 2 must satisfies the following seven conditions:

$$0.73 \leq f2/TTL2 \leq 0.80 \tag{8}$$

$$-2.5 \leq (R2_{11}-R2_{12})/(R2_{11}+R2_{12}) \leq -1.9 \tag{9}$$

$$0.4 \leq (R2_{21}-R2_{22})/(R2_{21}+R2_{22}) \leq 0.5 \tag{10}$$

$$-1.2 \leq f2_2/f2 \leq -1.0 \tag{11}$$

$$-14.0 \leq (R2_{31}-R2_{32})/(R2_{31}+R2_{32}) \leq -2.4 \tag{12}$$

$$2.2 \leq f2_3/f2 \leq 2.7 \tag{13}$$

$$0.65 \leq f2_4/f2 \leq 0.7 \tag{14}$$

wherein f2 is an effective focal length of the lens assembly 2, TTL2 is a distance from the object side surface S21 of the first lens L21 to the image plane IMA2 along the optical axis OA2, $R2_{11}$ is a radius of curvature of the object side surface S21 of the first lens L21, $R2_{12}$ is a radius of curvature of the image side surface S22 of the first lens L21, $R2_{21}$ is a radius of curvature of the object side surface S24 of the second lens L22, $R2_{22}$ is a radius of curvature of the image side surface S25 of the second lens L22, $f2_2$ is an effective focal length of the second lens L22, $R2_{31}$ is a radius of curvature of the object side surface S26 of the third lens L23, $R2_{32}$ is a radius of curvature of the image side surface S27 of the third lens L23, $f2_3$ is an effective focal length of the third lens L23, and $f2_4$ is an effective focal length of the fourth lens L24.

By the above design of the lenses and stop ST2, the lens assembly 2 is provided with a shortened total lens length, an effective corrected aberration and an increased resolution.

In order to achieve the above purposes and effectively enhance the optical performance, the lens assembly 2 in accordance with the second embodiment of the invention is provided with the optical specifications shown in Table 3, which include the effective focal length, F-number, field of view, total lens length, radius of curvature of each lens surface, thickness between adjacent surface, refractive index of each lens and Abbe number of each lens. Table 3 shows that the effective focal length is equal to 2.705 mm, F-number is equal to 2.4, field of view is equal to 79.50° and total lens length is equal to 3.500 mm for the lens assembly 2 of the second embodiment of the invention.

TABLE 3

Effective Focal Length = 2.705 mm F-number = 2.4
Field of View = 79.50° Total Lens Length = 3.500 mm

| Surface Number | Radius of Curvature (mm) | Thickness (mm) | Nd | Vd | Remark |
|---|---|---|---|---|---|
| S21 | 1.64534 | 0.412 | 1.544 | 56.1 | The First Lens L21 |
| S22 | -4.36832 | 0.020 | | | |
| S23 | ∞ | 0.020 | | | Stop ST2 |
| S24 | 3.75734 | 0.250 | 1.636 | 23.9 | The Second Lens L22 |
| S25 | 1.24618 | 0.193 | | | |
| S26 | 4.83745 | 0.341 | 1.544 | 56.1 | The Third Lens L23 |
| S27 | -11.62055 | 0.374 | | | |
| S28 | -2.83375 | 0.522 | 1.544 | 56.1 | The Fourth Lens L24 |
| S29 | -0.77039 | 0.269 | | | |
| S210 | -10.32207 | 0.282 | 1.582 | 30.2 | The Fifth Lens L25 |
| S211 | 0.93920 | 0.392 | | | |
| S212 | ∞ | 0.175 | 1.517 | 64.2 | Optical Filter OF2 |
| S213 | ∞ | 0.251 | | | |

The aspheric surface sag z of each lens in table 3 can be calculated by the following formula:

$$z = ch^2 / \{1 + [1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 4.

For the lens assembly 2 of the second embodiment, the Abbe number of the first lens L21 and the third lens L23 are equal to 56.1, the Abbe number of the fifth lens L25 is equal to 30.2, the Abbe number of the second lens L22 is equal to 23.9, the effective focal length f2 of the lens assembly 2 is equal to 2.705 mm, the distance TTL2 from the object side surface S21 of the first lens L21 to the image plane IMA2 along the optical axis OA2 is equal to 3.500 mm, the radius of curvature $R2_{11}$ of the object side surface S21 of the first lens L21 is equal to 1.64534 mm, the radius of curvature $R2_{12}$ of the image side surface S22 of the first lens L21 is equal to -4.36832 mm, the radius of curvature $R2_{21}$ of the object side surface S24 of the second lens L22 is equal to 3.75734 mm, the radius of curvature $R2_{22}$ of the image side surface S25 of the second lens L22 is equal to 1.24618 mm, the effective focal length $f2_2$ of the second lens L22 is equal to -3.03017 mm, the radius of curvature $R2_{31}$ of the object side surface S26 of the third lens L23 is equal to 4.83745 mm, the radius of curvature $R2_{32}$ of the image side surface S27 of the third lens L23 is equal to -11.62055 mm, the effective focal length $f2_3$ of the third lens L23 is equal to 6.30243 mm, and the effective focal length $f2_4$ of the fourth lens L24 is equal to 1.77902 mm. According to the above data, the following values can be obtained:

$f2/TTL2 = 0.7728$, $(R2_{11} - R2_{12})/(R2_{11} + R2_{12}) = -2.2085$, $(R2_{21} - R2_{22})/(R2_{21} + R2_{22}) = 0.5019$, $f2_2/f2 = -1.1203$, $(R2_{31} - R2_{32})/(R2_{31} + R2_{32}) = -2.4263$, $f2_3/f2 = 2.3301$, $f2_4/f2 = 0.6577$ which respectively satisfy the above conditions (8)-(14).

Figure 4A:
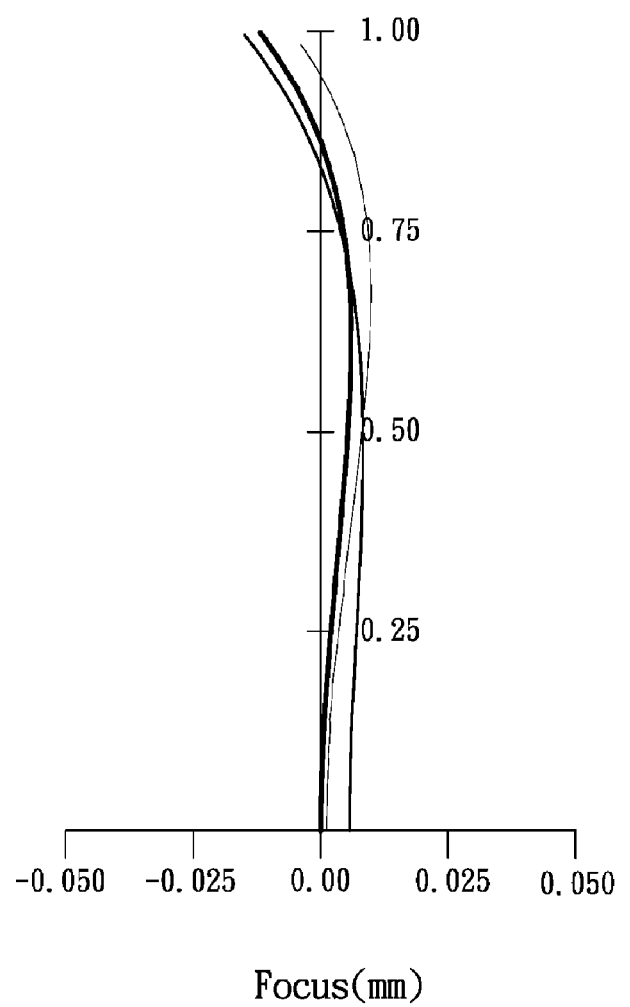
FIG. 4A depicts a longitudinal spherical aberration of the lens assembly in accordance with the second embodiment of the invention.
Figure 4B:
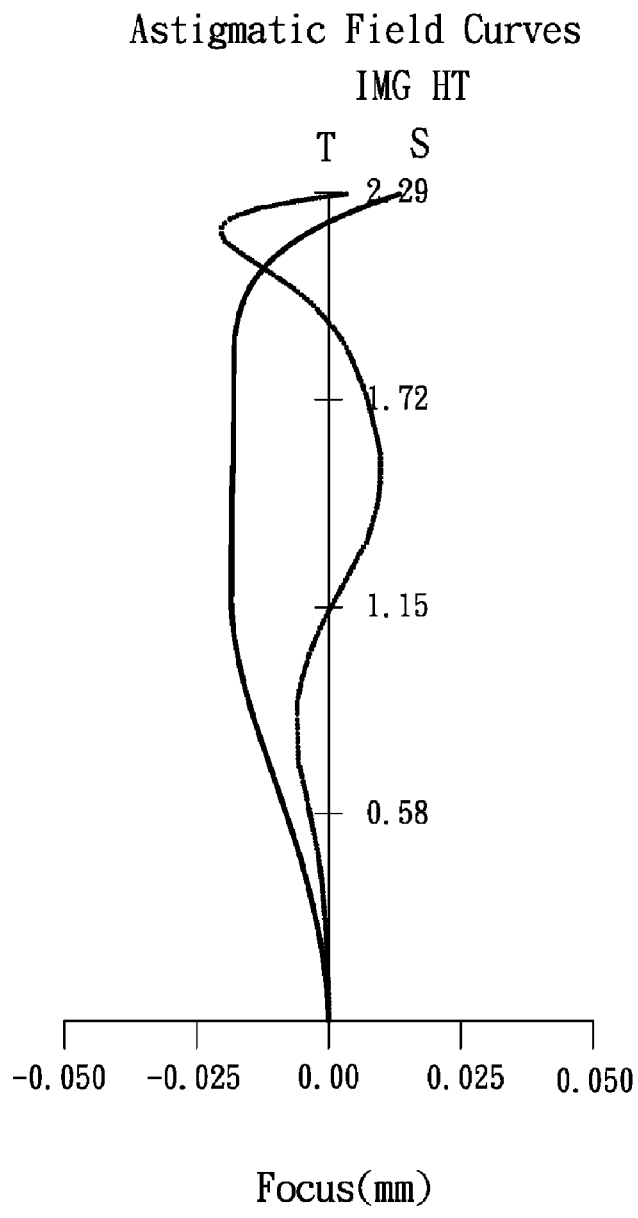
FIG. 4B is an astigmatic field curves diagram of the lens assembly in accordance with the second embodiment of the invention.
Figure 4C:
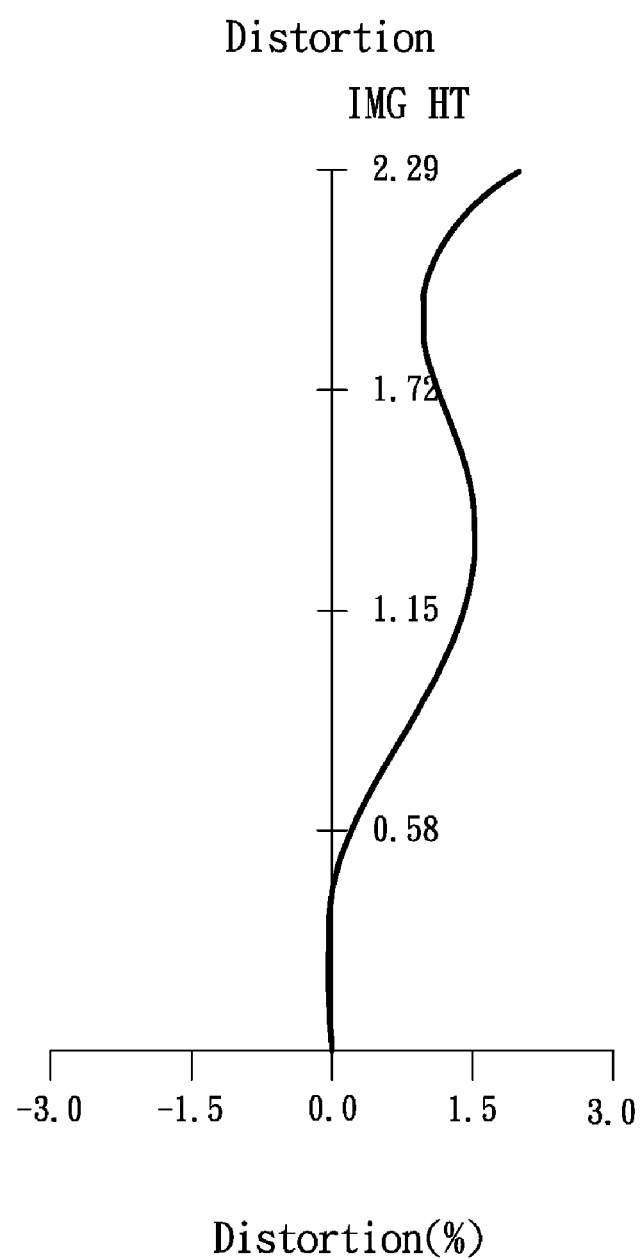
FIG. 4C is a distortion diagram of the lens assembly in accordance with the second embodiment of the invention.

By the above arrangements of the lenses and stop ST2, the lens assembly 2 of the second embodiment can meet the requirements of optical performance as seen in FIGS. 4A-4C, wherein FIG. 4A shows a longitudinal spherical aberration diagram of the lens assembly 2 in accordance with the second embodiment of the invention, FIG. 4B shows an astigmatic field curves of the lens assembly 2 in accordance with the second embodiment of the invention and FIG. 4C shows a distortion diagram of the lens assembly 2 in accordance with the second embodiment of the invention.

It can be seen from FIG. 4A that the longitudinal spherical aberration in the lens assembly 2 of the second embodiment ranges between -0.025 mm and 0.0125 mm for the wave-

TABLE 4

| Surface Number | k | A | B | C | D | E | F | G |
|---|---|---|---|---|---|---|---|---|
| S21 | -6.14651E-01 | -2.29763E-02 | -9.96599E-02 | 2.01278E-01 | 6.26564E-02 | -1.04099E+00 | 6.56942E-01 | 4.06723E-01 |
| S22 | -1.01947E+01 | 1.12813E-01 | 4.82773E-02 | -5.75762E-01 | 4.24667E-01 | 0.00000E+00 | 0.00000E+00 | 0.00000E+00 |
| S24 | -6.43059E+01 | 3.79871E-02 | 6.55759E-01 | -2.09134E+00 | 1.98788E+00 | -2.67839E-01 | 0.00000E+00 | 0.00000E+00 |
| S25 | -6.95577E+00 | 4.11617E-02 | 5.34889E-01 | -1.25159E+00 | 5.66540E-01 | 1.52614E+00 | -2.08532E+00 | 7.23775E-01 |
| S26 | -6.40861E+01 | -1.45374E-01 | 1.56716E-01 | -7.31959E-03 | 2.91793E-01 | 5.34039E-01 | -5.09840E-01 | -8.11985E-02 |
| S27 | 1.31796E+00 | -1.26255E-01 | -1.49662E-04 | -1.76801E-01 | 2.12939E-01 | 4.50804E-01 | -3.38145E-01 | 5.57866E-01 |
| S28 | 0.00000E+00 | 2.61510E-03 | -1.92567E-02 | 4.53813E-02 | -1.52941E-01 | -4.01680E-04 | 7.63292E-02 | -3.79447E-03 |
| S29 | -3.85077E+00 | -1.77657E-01 | 3.00274E-01 | -1.50293E-01 | 5.00680E-03 | 2.11035E-02 | -2.54587E-03 | -3.53596E-03 |
| S210 | 0.00000E+00 | -1.28122E-01 | 3.95387E-02 | 2.70178E-03 | -1.41665E-03 | -5.22446E-05 | 4.54774E-05 | -2.29767E-05 |
| S211 | -7.97329E+00 | -1.19704E-01 | 4.71374E-02 | -1.69479E-02 | 2.72905E-03 | -1.31640E-04 | -2.17543E-06 | 7.96183E-07 | length of 470.0000 nm, 555.0000 nm and 650.0000 nm. It can be seen from FIG. 4B that the astigmatic field curves of tangential direction and sagittal direction in the lens assembly 2 of the second embodiment ranges between -0.025 mm and 0.025 mm for the wavelength of 555.0000 nm. It can be seen from FIG. 4C that the distortion in the lens assembly 2 of the second embodiment ranges between 0% and 2.0% for the wavelength of 555.0000 nm. It is obvious that the longitudinal spherical aberration, the astigmatic field curves and the distortion of the lens assembly 2 of the second embodiment can be corrected effectively. Therefore, the lens assembly 2 of the second embodiment is capable of good optical performance.

Figure 5:
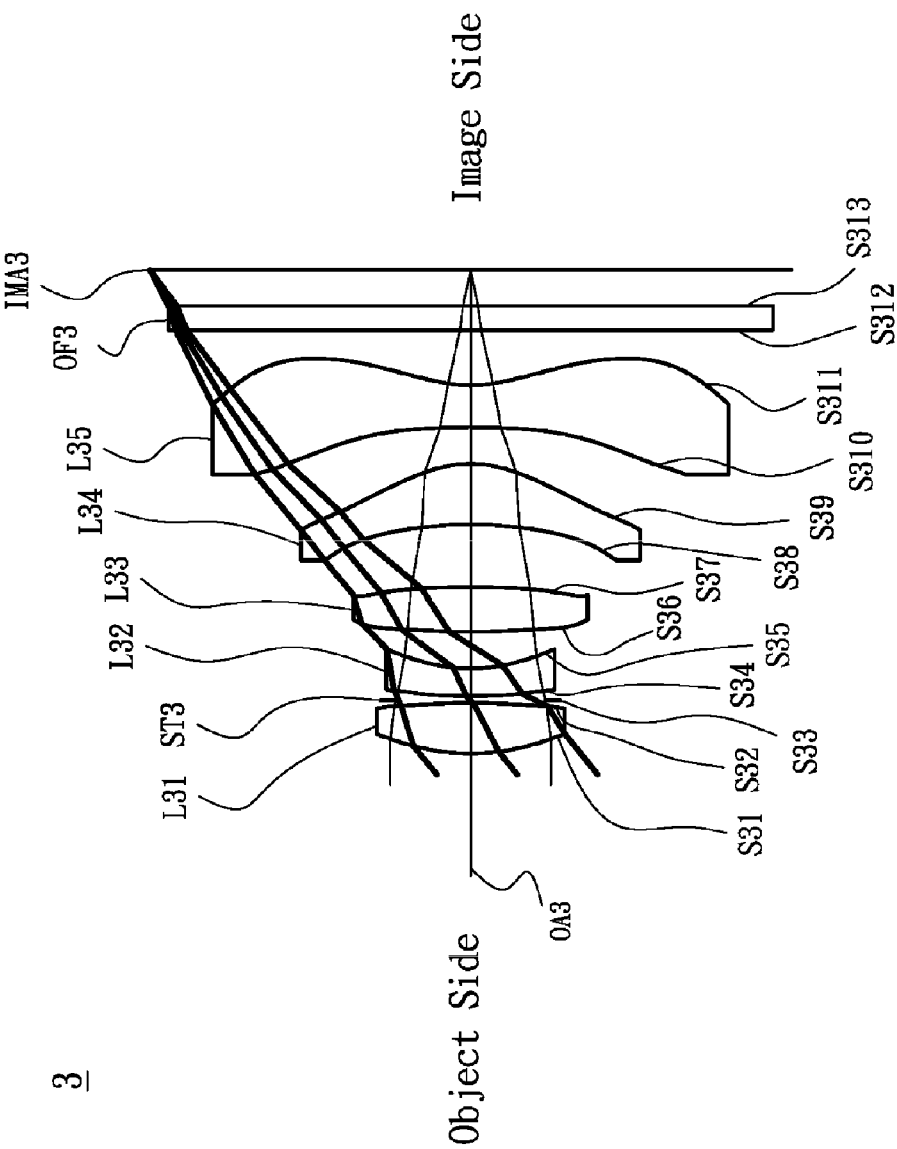
FIG. 5 is a lens layout and optical path diagram of a lens assembly in accordance with a third embodiment of the invention.

Referring to FIG. 5, FIG. 5 is a lens layout and optical path diagram of a lens assembly in accordance with a third embodiment of the invention. The lens assembly 3 includes a first lens L31, a stop ST3, a second lens L32, a third lens L33, a fourth lens L34, a fifth lens L35 and an Optical filter OF3, all of which are arranged in sequence from an object side to an image side along an optical axis OA3. In operation, an image of light rays from the object side is formed at an image plane IMA3. The first lens L31 is made of plastic material and with positive refractive power, wherein the object side surface S31 is a convex surface, the image side surface S32 is a convex surface and both of the object side surface S31 and image side surface S32 are aspheric surfaces. The second lens L32 is made of plastic material and with negative refractive power, wherein the object side surface S34 is a convex surface, the image side surface S35 is a concave surface and both of the object side surface S34 and image side surface S35 are aspheric surfaces. The third lens L33 is made of plastic material and with positive refractive power, wherein the object side surface S36 is a convex surface, the image side surface S37 is a convex surface and both of the object side surface S36 and image side surface S37 are aspheric surfaces. The fourth lens L34 is made of plastic material and with positive refractive power, wherein the object side surface S38 is a concave surface, the image side surface S39 is a convex surface and both of the object side surface S38 and image side surface S39 are aspheric surfaces. The fifth lens L35 is made of plastic material and with negative refractive power, wherein around the optical axis OA3 of the object side surface S310 is a concave surface, around the optical axis OA3 of the image side surface S311 is a concave surface and both of the object side surface S310 and image side surface S311 are aspheric surfaces. Both of the object side surface S312 and image side surface S313 of the optical filter OF3 are plane surfaces. The first lens L31 and the third lens L33 are made of the same material and with the same Abbe number. The Abbe number of the first lens L31, the third lens L33 and the fifth lens L35 are greater than the Abbe number of the second lens L32.

In order to maintain excellent optical performance of the lens assembly in accordance with the third embodiment of the invention, the lens assembly 3 must satisfies the following seven conditions:

$$0.73 \leq f3/TTL3 \leq 0.80 \quad (15)$$

$$-2.5 \leq (R3_{11}-R3_{12})/(R3_{11}+R3_{12}) \leq -1.9 \quad (16)$$

$$0.4 \leq (R3_{21}-R3_{22})/(R3_{21}+R3_{22}) \leq 0.5 \quad (17)$$

$$-1.2 \leq f3_2/f3 \leq -1.0 \quad (18)$$

$$-14.0 \leq (R3_{31}-R3_{32})/(R3_{31}+R3_{32}) \leq -2.4 \quad (19)$$

$$2.2 \leq f3_3/f3 \leq 2.7 \quad (20)$$

$$0.65 \leq f3_4/f3 \leq 0.7 \quad (21)$$

wherein f3 is an effective focal length of the lens assembly 3, TTL3 is a distance from the object side surface S31 of the first lens L31 to the image plane IMA3 along the optical axis OA3, $R3_{11}$ is a radius of curvature of the object side surface S31 of the first lens L31, $R3_{12}$ is a radius of curvature of the image side surface S32 of the first lens L31, $R3_{21}$ is a radius of curvature of the object side surface S34 of the second lens L32, $R3_{22}$ is a radius of curvature of the image side surface S35 of the second lens L32, $f3_2$ is an effective focal length of the second lens L32, $R3_{31}$ is a radius of curvature of the object side surface S36 of the third lens L33, $R3_{32}$ is a radius of curvature of the image side surface S37 of the third lens L33, $f3_3$ is an effective focal length of the third lens L33, and $f3_4$ is an effective focal length of the fourth lens L34.

By the above design of the lenses and stop ST3, the lens assembly 3 is provided with a shortened total lens length, an effective corrected aberration and an increased resolution.

In order to achieve the above purposes and effectively enhance the optical performance, the lens assembly 3 in accordance with the third embodiment of the invention is provided with the optical specifications shown in Table 5, which include the effective focal length, F-number, field of view, total lens length, radius of curvature of each lens surface, thickness between adjacent surface, refractive index of each lens and Abbe number of each lens. Table 5 shows that the effective focal length is equal to 2.773 mm, F-number is equal to 2.4, field of view is equal to 77.9° and total lens length is equal to 3.500 mm for the lens assembly 3 of the third embodiment of the invention.

TABLE 5

Effective Focal Length = 2.773 mm F-number = 2.4
Field of View = 77.90° Total Lens Length = 3.500 mm

| Surface Number | Radius of Curvature (mm) | Thickness (mm) | Nd | Vd | Remark |
|---|---|---|---|---|---|
| S31 | 1.54820 | 0.365 | 1.544 | 56.1 | The First Lens L31 |
| S32 | −4.76373 | 0.020 | | | |
| S33 | ∞ | 0.030 | | | Stop ST3 |
| S34 | 3.13608 | 0.200 | 1.636 | 23.9 | The Second Lens L32 |
| S35 | 1.13344 | 0.265 | | | |
| S36 | 4.79957 | 0.322 | 1.544 | 56.1 | The Third Lens L33 |
| S37 | −11.41386 | 0.455 | | | |
| S38 | −2.95380 | 0.440 | 1.544 | 56.1 | The Fourth Lens L34 |
| S39 | −0.80249 | 0.263 | | | |
| S310 | −7.67356 | 0.302 | 1.544 | 56.1 | The Fifth Lens L35 |
| S311 | 0.92807 | 0.402 | | | |
| S312 | ∞ | 0.175 | 1.517 | 64.2 | Optical Filter OF3 |
| S313 | ∞ | 0.247 | | | |

The aspheric surface sag z of each lens in table 5 can be calculated by the following formula:

$$z = ch^2/\{1+[1-(k+1)c^2h^2]^{1/2}\}+Ah^4+Bh^6+Ch^8+Dh^{10}+Eh^{12}+Fh^{14}+Gh^{16}$$

where c is curvature, h is the vertical distance from the lens surface to the optical axis, k is conic constant and A, B, C, D, E, F and G are aspheric coefficients.

In the third embodiment, the conic constant k and the aspheric coefficients A, B, C, D, E, F, G of each surface are shown in Table 6.

TABLE 6

| Surface Number | k | A | B | C | D | E | F | G |
|---|---|---|---|---|---|---|---|---|
| S31 | −4.72266E−01 | −1.83261E−02 | −8.73144E−02 | 2.07263E−01 | −7.32316E−02 | −1.04099E+00 | 6.56942E−01 | 4.06723E−01 |
| S32 | −5.44952E+00 | 1.07940E−01 | 5.40900E−02 | −5.83754E−01 | 3.35640E−01 | 0.00000E+00 | 0.00000E+00 | 0.00000E+00 |
| S34 | −7.69794E+01 | 2.37800E−02 | 6.19147E−01 | −2.12998E+00 | 2.11097E+00 | −2.67839E−01 | 0.00000E+00 | 0.00000E+00 |
| S35 | −6.48306E+00 | 4.89782E−02 | 5.36426E−01 | −1.25994E+00 | 5.19101E−01 | 1.52614E+00 | −2.08532E+00 | 7.23775E−01 |
| S36 | −2.18130E+01 | −1.36236E−01 | 1.40198E−01 | −5.74019E−02 | 2.32518E−01 | 5.21208E−01 | −5.09840E−01 | −8.11985E−02 |
| S37 | −2.11970E+00 | −1.30560E−01 | 1.27812E−02 | −1.65892E−01 | 1.98974E−01 | 3.93661E−01 | −4.73430E−01 | 5.57866E−01 |
| S38 | 0.00000E+00 | −5.06452E−03 | −1.93551E−02 | 6.06798E−02 | −1.44361E−01 | −1.45152E−03 | 6.94533E−02 | −1.15955E−02 |
| S39 | −4.10594E+00 | −1.75383E−01 | 2.96061E−01 | −1.52665E−01 | 4.92625E−03 | 2.16895E−02 | −2.06232E−03 | −3.23406E−03 |
| S310 | 0.00000E+00 | −1.17324E−01 | 3.90764E−02 | 2.29827E−03 | −1.46364E−03 | −4.69290E−05 | 5.02088E−05 | −1.97339E−05 |
| S311 | −7.69069E+00 | −1.14763E−01 | 4.94443E−02 | −1.78088E−02 | 2.64939E−03 | −1.35550E−04 | 8.69419E−07 | 2.83335E−06 |

For the lens assembly 3 of the third embodiment, the Abbe number of the first lens L31 and the third lens L33 are equal to 56.1, the Abbe number of the fifth lens L35 is equal to 56.1, the Abbe number of the second lens L32 is equal to 23.9, the effective focal length f3 of the lens assembly 3 is equal to 2.773 mm, the distance TTL3 from the object side surface S31 of the first lens L31 to the image plane IMA3 along the optical axis OA3 is equal to 3.500 mm, the radius of curvature $R3_{11}$ of the object side surface S31 of the first lens L31 is equal to 1.54820 mm, the radius of curvature $R3_{12}$ of the image side surface S32 of the first lens L31 is equal to −4.76373 mm, the radius of curvature $R3_{21}$ of the object side surface S34 of the second lens L32 is equal to 3.13608 mm, the radius of curvature $R3_{22}$ of the image side surface S35 of the second lens L32 is equal to 1.13344 mm, the effective focal length $f3_2$ of the second lens L32 is equal to −2.88481 mm, the radius of curvature $R3_{31}$ of the object side surface S36 of the third lens L33 is equal to 4.79957 mm, the radius of curvature $R3_{32}$ of the image side surface S37 of the third lens L33 is equal to −11.41386 mm, the effective focal length $f3_3$ of the third lens L33 is equal to 6.23269 mm, and the effective focal length $f3_4$ of the fourth lens L34 is equal to 1.88222 mm. According to the above data, the following values can be obtained:

$f3/TTL3=0.7924$, $(R3_{11}-R3_{12})/(R3_{11}+R3_{12})=-1.9629$, $(R3_{21}-R3_{22})/(R3_{21}+R3_{22})=0.4691$, $f3_2/f3=-1.0401$, $(R3_{31}-R3_{32})/(R3_{31}+R3_{32})=-2.4513$, $f3_3/f3=2.2473$, $f3_4/f3=0.6786$ which respectively satisfy the above conditions (15)-(21).

Figure 6A:
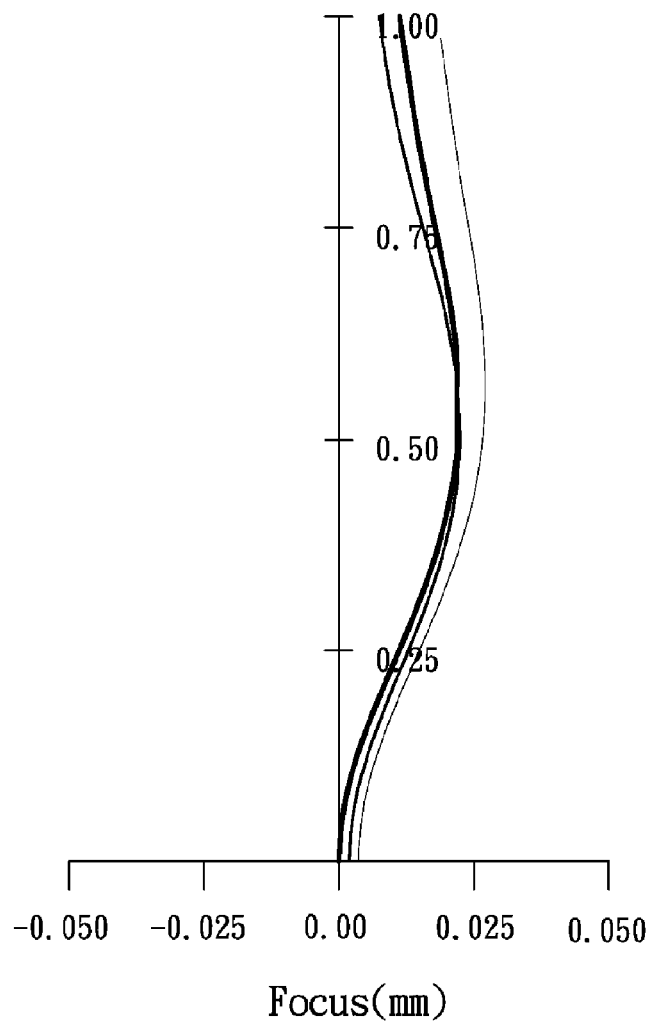
FIG. 6A depicts a longitudinal spherical aberration of the lens assembly in accordance with the third embodiment of the invention.
Figure 6B:
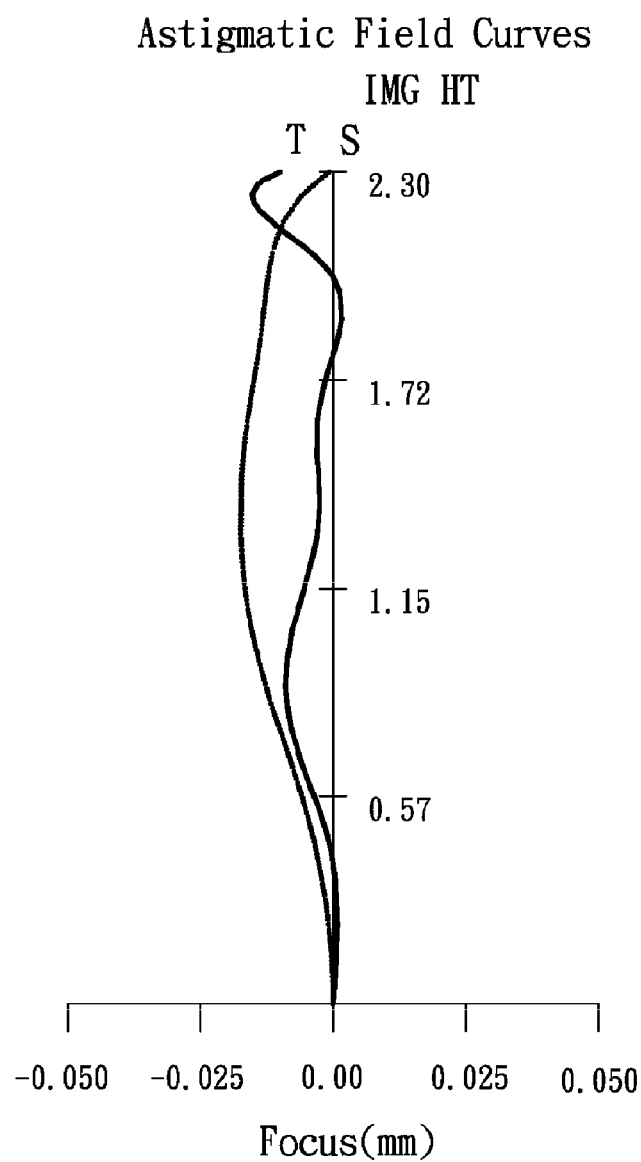
FIG. 6B is an astigmatic field curves diagram of the lens assembly in accordance with the third embodiment of the invention.
Figure 6C:
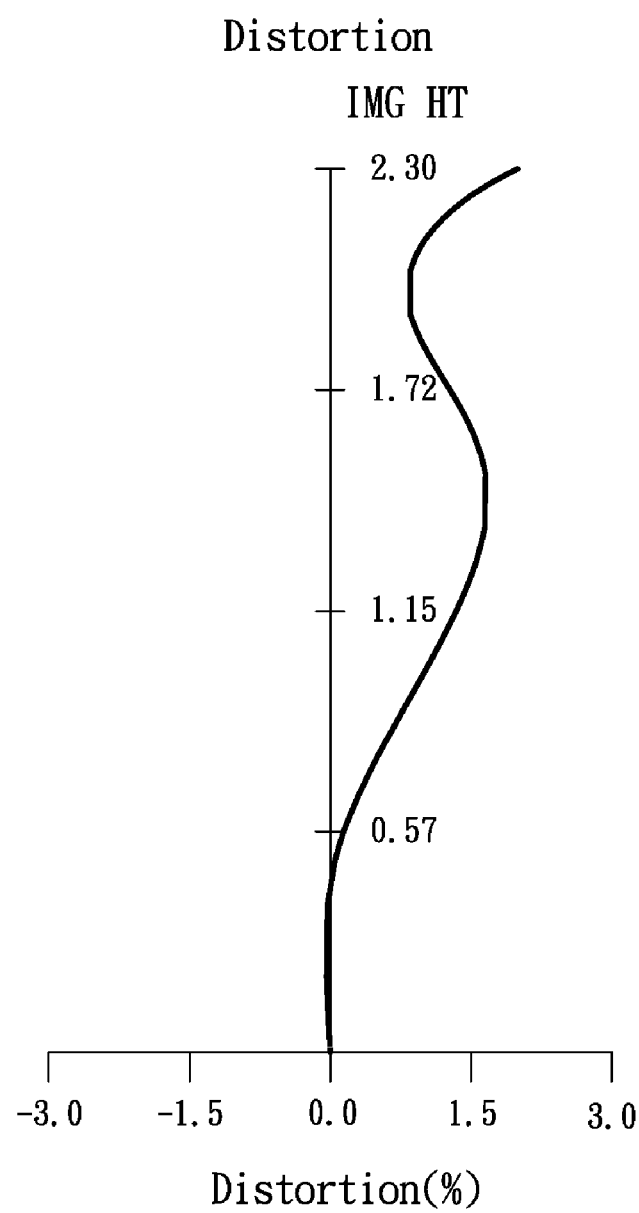
FIG. 6C is a distortion diagram of the lens assembly in accordance with the third embodiment of the invention.

By the above arrangements of the lenses and stop ST3, the lens assembly 3 of the third embodiment can meet the requirements of optical performance as seen in FIGS. 6A-6C, wherein FIG. 6A shows a longitudinal spherical aberration diagram of the lens assembly 3 in accordance with the third embodiment of the invention, FIG. 6B shows an astigmatic field curves of the lens assembly 3 in accordance with the third embodiment of the invention and FIG. 6C shows a distortion diagram of the lens assembly 3 in accordance with the third embodiment of the invention.

It can be seen from FIG. 6A that the longitudinal spherical aberration in the lens assembly 3 of the third embodiment ranges between 0.000 mm and 0.03 mm for the wavelength of 470.0000 nm, 555.0000 nm and 650.0000 nm. It can be seen from FIG. 6B that the astigmatic field curves of tangential direction and sagittal direction in the lens assembly 3 of the third embodiment ranges between −0.025 mm and 0.005 mm for the wavelength of 555.0000 nm. It can be seen from FIG. 6C that the distortion in the lens assembly 3 of the third embodiment ranges between 0% and 2.0% for the wavelength of 555.0000 nm. It is obvious that the longitudinal spherical aberration, the astigmatic field curves and the distortion of the lens assembly 3 of the third embodiment can be corrected effectively. Therefore, the lens assembly 3 of the third embodiment is capable of good optical performance.

Figure 7:
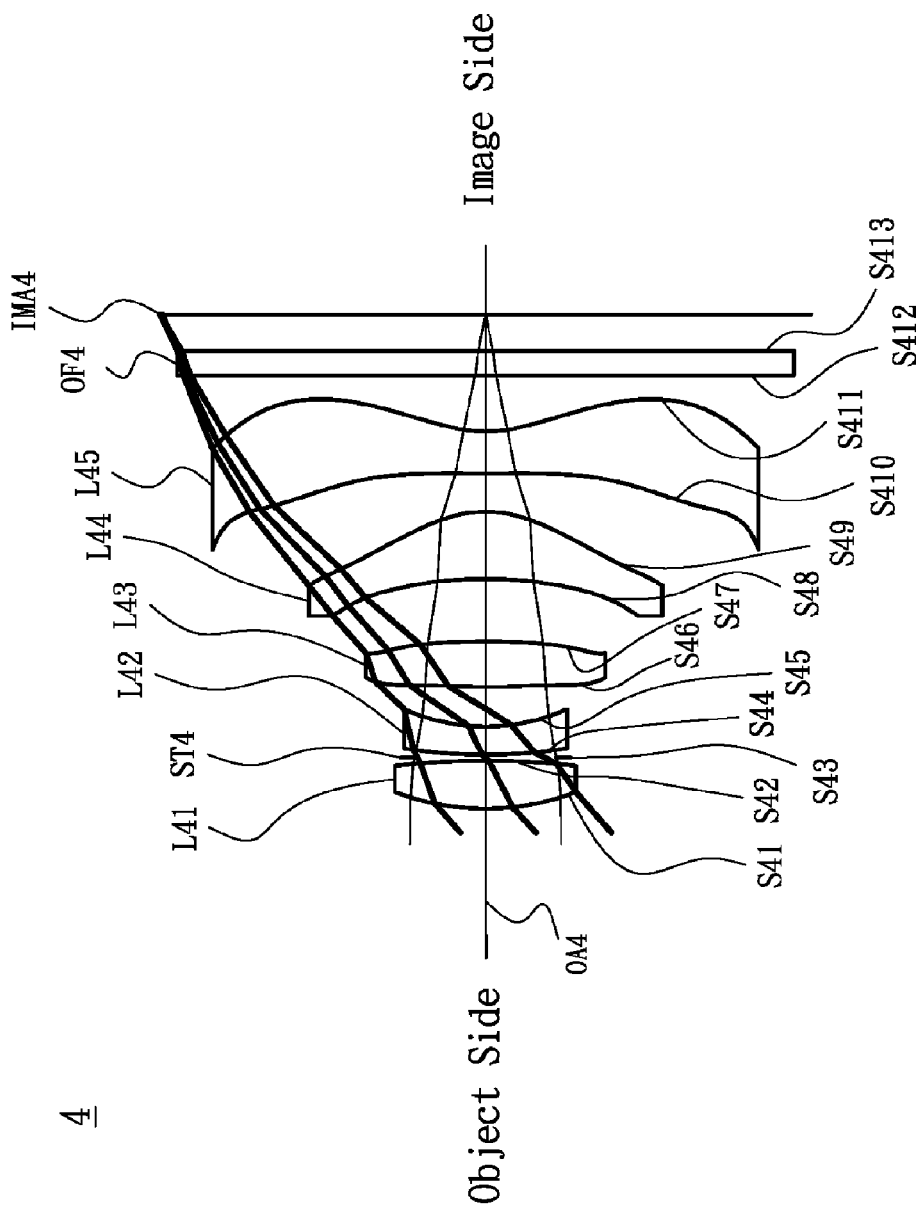
FIG. 7 is a lens layout and optical path diagram of a lens assembly in accordance with a fourth embodiment of the invention.

Referring to FIG. 7, FIG. 7 is a lens layout and optical path diagram of a lens assembly in accordance with a fourth embodiment of the invention. The lens assembly 4 includes a first lens L41, a stop ST4, a second lens L42, a third lens L43, a fourth lens L44, a fifth lens L45 and an Optical filter OF4, all of which are arranged in sequence from an object side to an image side along an optical axis OA4. In operation, an image of light rays from the object side is formed at an image plane IMA4. The first lens L41 is made of plastic material and with positive refractive power, wherein the object side surface S41 is a convex surface, the image side surface S42 is a convex surface and both of the object side surface S41 and image side surface S42 are aspheric surfaces. The second lens L42 is made of plastic material and with negative refractive power, wherein the object side surface S44 is a convex surface, the image side surface S45 is a concave surface and both of the object side surface S44 and image side surface S45 are aspheric surfaces. The third lens L43 is made of plastic material and with positive refractive power, wherein the object side surface S46 is a convex surface, the image side surface S47 is a convex surface and both of the object side surface S46 and image side surface S47 are aspheric surfaces. The fourth lens L44 is made of plastic material and with positive refractive power, wherein the object side surface S48 is a concave surface, the image side surface S49 is a convex surface and both of the object side surface S48 and image side surface S49 are aspheric surfaces. The fifth lens L45 is made of plastic material and with negative refractive power, wherein around the optical axis OA4 of the object side surface S410 is a convex surface, around the optical axis OA4 of the image side surface S411 is a concave surface and both of the object side surface S410 and image side surface S411 are aspheric surfaces. Both of the object side surface S412 and image side surface S413 of the optical filter OF4 are plane surfaces. The first lens L41 and the third lens L43 are made of the same material and with the same Abbe number. The Abbe number of the first lens L41, the third lens L43 and the fifth lens L45 are greater than the Abbe number of the second lens L42.

In order to maintain excellent optical performance of the lens assembly in accordance with the fourth embodiment of the invention, the lens assembly 4 must satisfies the following seven conditions:

$$0.73 \leq f4/TTL4 \leq 0.80 \quad (22)$$

$$-2.5 \leq (R4_{11}-R4_{12})/(R4_{11}+R4_{12}) \leq -1.9 \quad (23)$$

$$0.4 \leq (R4_{21}-R4_{22})/(R4_{21}+R4_{22}) \leq 0.5 \quad (24)$$

$$-1.2 \leq f4_2/f4 \leq -1.0 \quad (25)$$

$$-14.0 \leq (R4_{31}-R4_{32})/(R4_{31}+R4_{32}) \leq -2.4 \quad (26)$$

$$2.2 \leq f4_3/f4 \leq 2.7 \quad (27)$$

$$0.65 \leq f4_4/f4 \leq 0.7 \quad (28)$$

wherein f4 is an effective focal length of the lens assembly 4, TTL4 is a distance from the object side surface S41 of the first lens L41 to the image plane IMA4 along the optical axis OA4, $R4_{11}$ is a radius of curvature of the object side surface S41 of the first lens L41, $R4_{12}$ is a radius of curvature of the image side surface S42 of the first lens L41, $R4_{21}$ is a radius of curvature of the object side surface S44 of the second lens L42, $R4_{22}$ is a radius of curvature of the image side surface S45 of the second lens L42, $f4_2$ is an effective focal length of the second lens L42, $R4_{31}$ is a radius of curvature of the object side surface S46 of the third lens L43, $R4_{32}$ is a radius of curvature of the image side surface S47 of the third lens L43, $f4_3$ is an effective focal length of the third lens L43, and $f4_4$ is an effective focal length of the fourth lens L44.

By the above design of the lenses and stop ST4, the lens assembly 4 is provided with a shortened total lens length, an effective corrected aberration and an increased resolution.

In order to achieve the above purposes and effectively enhance the optical performance, the lens assembly 4 in accordance with the fourth embodiment of the invention is provided with the optical specifications shown in Table 7, which include the effective focal length, F-number, field of view, total lens length, radius of curvature of each lens surface, thickness between adjacent surface, refractive index of each lens and Abbe number of each lens. Table 7 shows that the effective focal length is equal to 2.555 mm, F-number is equal to 2.0, field of view is equal to 82.0° and total lens length is equal to 3.500 mm for the lens assembly 4 of the fourth embodiment of the invention.

TABLE 7

Effective Focal Length = 2.555 mm F-number = 2.0
Field of View = 82.0° Total Lens Length = 3.500 mm

| Surface Number | Radius of Curvature (mm) | Thickness (mm) | Nd | Vd | Remark |
|---|---|---|---|---|---|
| S41 | 1.6796 | 0.3405 | 1.544 | 56.1 | The First Lens L41 |
| S42 | −4.1385 | 0.0200 | | | |
| S43 | ∞ | 0.0199 | | | Stop ST4 |
| S44 | 2.8044 | 0.2000 | 1.636 | 23.9 | The Second Lens L42 |
| S45 | 1.1158 | 0.2821 | | | |
| S46 | 6.1565 | 0.3205 | 1.544 | 56.1 | The Third Lens L43 |
| S47 | −7.4985 | 0.4450 | | | |
| S48 | −2.8115 | 0.4753 | 1.544 | 56.1 | The Fourth Lens L44 |
| S49 | −0.7672 | 0.2695 | | | |
| S410 | 24.9216 | 0.2970 | 1.582 | 30.2 | The Fifth Lens L45 |
| S411 | 0.8717 | 0.3985 | | | |
| S412 | ∞ | 0.1750 | 1.517 | 64.2 | Optical Filter OF4 |
| S413 | ∞ | 0.2566 | | | |

The aspheric surface sag z of each lens in table 7 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the fourth embodiment, the conic constant k and the aspheric coefficients A, B, C, D, E, F, G of each surface are shown in Table 8.

TABLE 8

| Surface Number | k | A | B | C | D | E | F | G |
|---|---|---|---|---|---|---|---|---|
| S41 | −5.4255E−01 | −2.1033E−02 | −7.9912E−02 | 2.1524E−01 | −5.0824E−02 | −1.0410E+00 | 6.5694E−01 | 4.0672E−01 |
| S42 | −1.3044E+01 | 1.1591E−01 | 5.3020E−02 | −5.7690E−01 | 2.6129E−01 | 0.0000E+00 | 0.0000E+00 | 0.0000E+00 |
| S44 | −7.3607E+01 | 2.5467E−02 | 6.1200E−01 | −2.1788E+00 | 2.0538E+00 | −2.6718E−01 | 0.0000E+00 | 0.0000E+00 |
| S45 | −7.0628E+00 | 3.3995E−02 | 5.0809E−01 | −1.2817E+00 | 5.0965E−01 | 1.5230E+00 | −2.0862E+00 | 7.2356E−01 |
| S46 | −7.0494E+01 | −1.5050E−01 | 1.3562E−01 | −5.8089E−02 | 2.3831E−01 | 5.3146E−01 | −5.0504E−01 | −7.8466E−02 |
| S47 | 2.3069E+01 | −1.3394E−01 | 9.3223E−03 | −1.6912E−01 | 1.9707E−01 | 3.8709E−01 | −4.8903E−01 | 5.5613E−01 |
| S48 | 0.0000E+00 | 4.7480E−03 | −4.9994E−02 | 6.9145E−02 | −1.4701E−01 | −4.8372E−03 | 6.8039E−02 | −1.3239E−02 |
| S49 | −3.7978E+00 | −1.7158E−01 | 2.9052E−01 | −1.5408E−01 | 5.1273E−03 | 2.1992E−02 | −1.8385E−03 | −2.9307E−03 |
| S410 | 9.0000E+01 | −1.3109E−01 | 3.3520E−02 | 3.0882E−03 | −1.2914E−03 | −6.1803E−05 | 6.4100E−05 | −1.8627E−05 |
| S411 | −6.1992E+00 | −1.1826E−01 | 4.9462E−02 | −1.7089E−02 | 2.7101E−03 | −1.3841E−04 | −3.7874E−06 | 5.8200E−07 |

For the lens asembly 4 of the fourth embodiment, the Abbe number of the first lens L41 and the third lens L43 are equal to 56.1, the Abbe number of the fifth lens L45 is equal to 30.2, the Abbe number of the second lens L42 is equal to 23.9, the effective focal length f4 of the lens assembly 4 is equal to 2.555 mm, the distance TTL4 from the object side surface S41 of the first lens L41 to the image plane IMA4 along the optical axis OA4 is equal to 3.500 mm, the radius of curvature $R4_{11}$ of the object side surface S41 of the first lens L41 is equal to 1.67958 mm, the radius of curvature $R4_{12}$ of the image side surface S42 of the first lens L41 is equal to −4.13849 mm, the radius of curvature $R4_{21}$ of the object side surface S44 of the second lens L42 is equal to 2.80443 mm, the radius of curvature $R4_{22}$ of the image side surface S45 of the second lens L42 is equal to 1.11582 mm, the effective focal length $f4_2$ of the second lens L42 is equal to −3.03488 mm, the radius of curvature $R4_{31}$ of the object side surface S46 of the third lens L43 is equal to 6.15654 mm, the radius of curvature $R4_{32}$ of the image side surface S47 of the third lens L43 is equal to −7.49855 mm, the effective focal length $f4_3$ of the third lens L43 is equal to 6.24439 mm, and the effective focal length $f4_4$ of the fourth lens L44 is equal to 1.78600 mm. According to the above data, the following values can be obtained:

$f4/TTL4=0.7300$, $(R4_{11}-R4_{12})/(R4_{11}+R4_{12})=-2.3661$, $(R4_{21}-R4_{22})/(R4_{21}+R4_{22})=0.4307$, $f4_2/f4=-1.1878$, $(R4_{31}-R4_{32})/(R4_{31}+R4_{32})=-10.1751$, $f4_3/f4=2.4440$, $f4_4/f4=0.6990$ which respectively satisfy the above conditions (22)-(28).

Figure 8A:
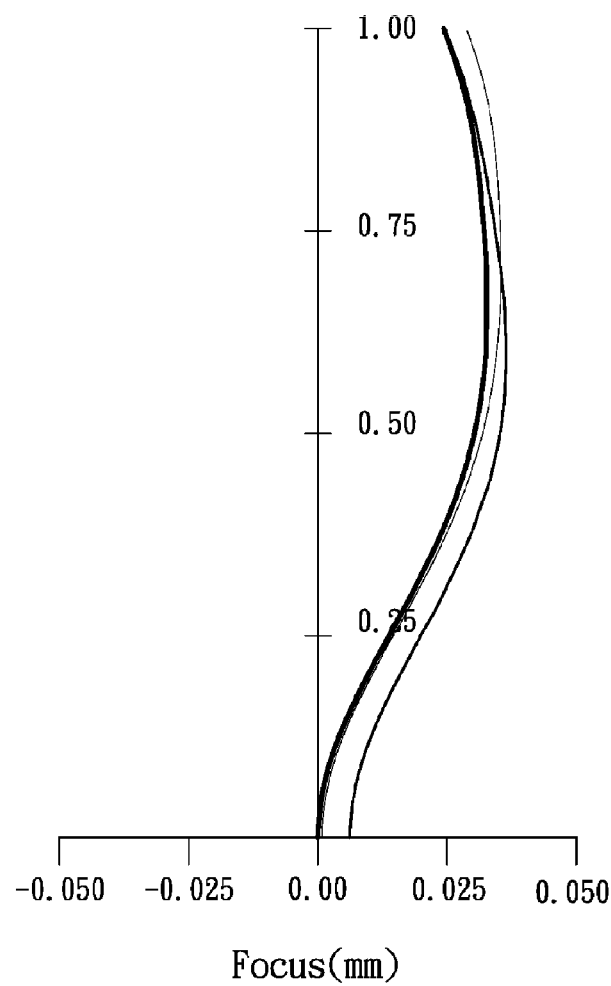
FIG. 8A depicts a longitudinal spherical aberration of the lens assembly in accordance with the fourth embodiment of the invention.
Figure 8B:
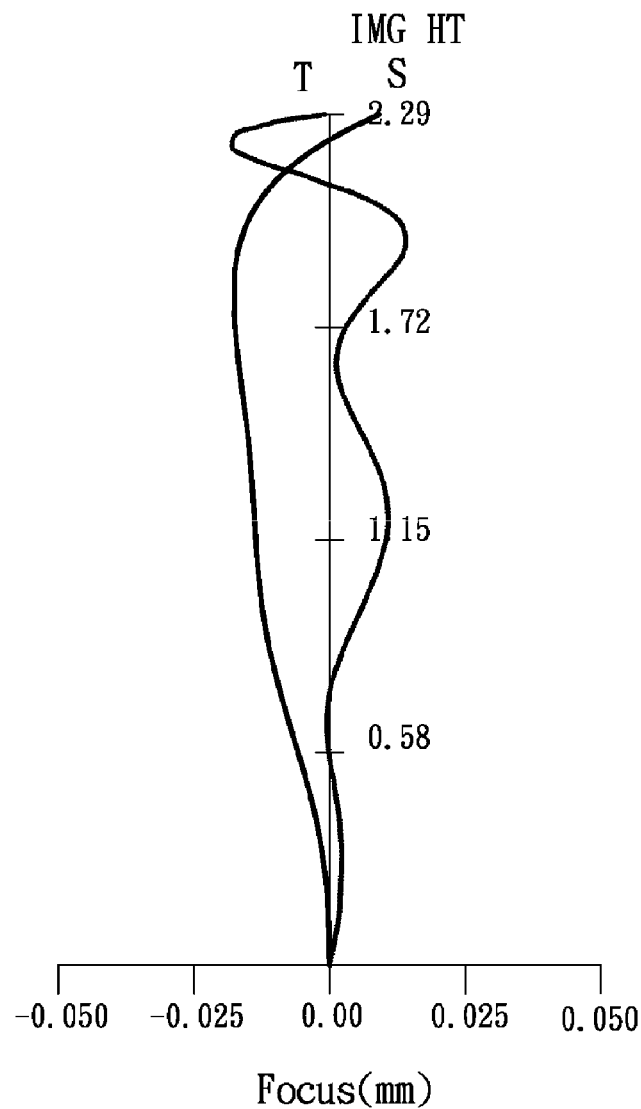
FIG. 8B is an astigmatic field curves diagram of the lens assembly in accordance with the fourth embodiment of the invention.
Figure 8C:
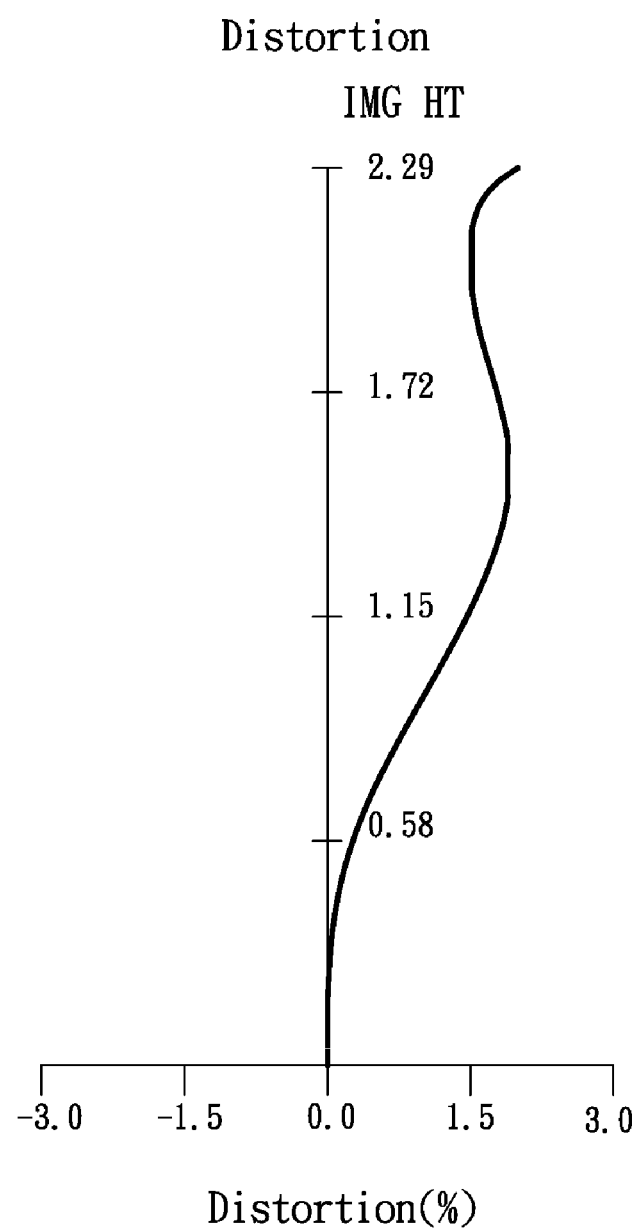
FIG. 8C is a distortion diagram of the lens assembly in accordance with the fourth embodiment of the invention.

By the above arrangements of the lenses and stop ST4, the lens assembly 4 of the fourth embodiment can meet the requirements of optical performance as seen in FIGS. 8A-8C, wherein FIG. 8A shows a longitudinal spherical aberration diagram of the lens assembly 4 in accordance with the fourth embodiment of the invention, FIG. 8B shows an astigmatic field curves of the lens assembly 4 in accordance with the fourth embodiment of the invention and FIG. 8C shows a distortion diagram of the lens assembly 4 in accordance with the fourth embodiment of the invention.

It can be seen from FIG. 8A that the longitudinal spherical aberration in the lens assembly 4 of the fourth embodiment ranges between 0.000 mm and 0.040 mm for the wavelength of 470.0000 nm, 555.0000 nm and 650.0000 nm. It can be seen from FIG. 8B that the astigmatic field curves of tangential direction and sagittal direction in the lens assembly 4 of the fourth embodiment ranges between −0.025 mm and 0.025 mm for the wavelength of 555.0000 nm. It can be seen from FIG. 8C that the distortion in the lens assembly 4 of the fourth embodiment ranges between 0% and 2.5% for the wavelength of 555.0000 nm. It is obvious that the longitudinal spherical aberration, the astigmatic field curves and the distortion of the lens assembly 4 of the fourth embodiment can be corrected effectively. Therefore, the lens assembly 4 of the fourth embodiment is capable of good optical performance.

Figure 9:
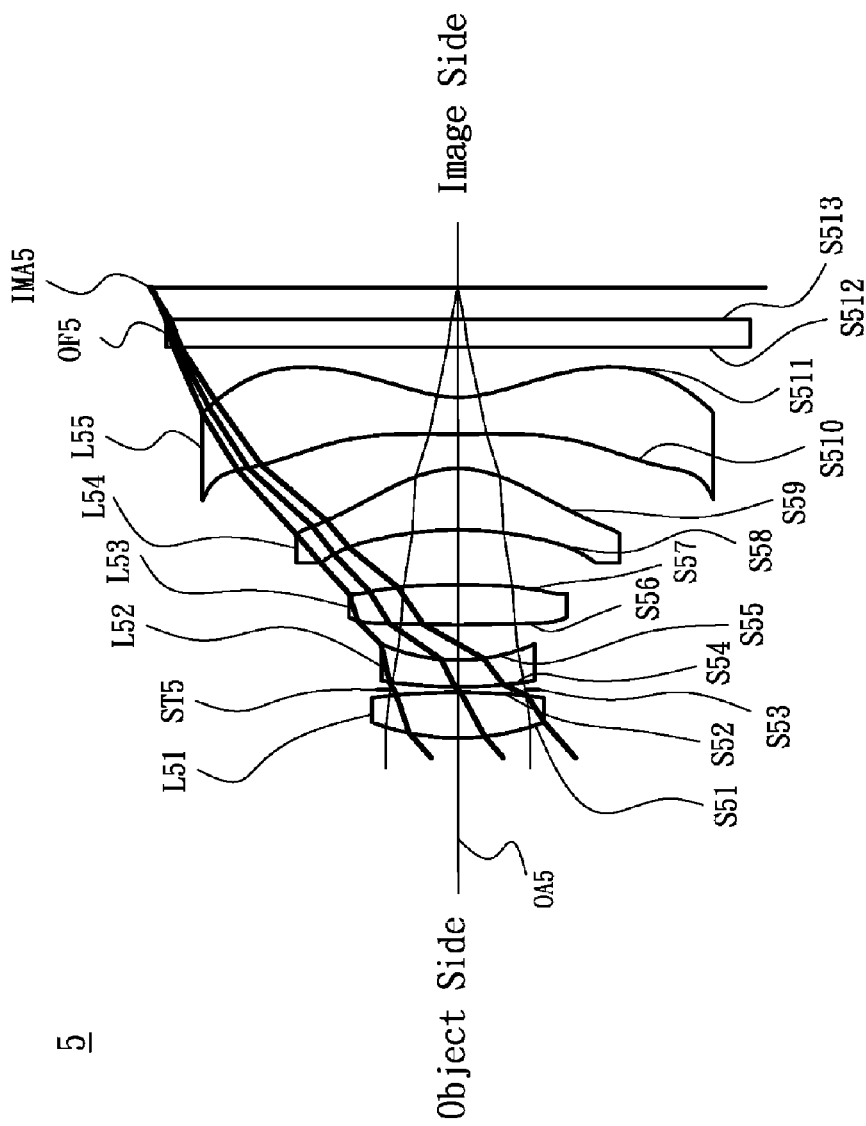
FIG. 9 is a lens layout and optical path diagram of a lens assembly in accordance with a fifth embodiment of the invention.

Referring to FIG. 9, FIG. 9 is a lens layout and optical path diagram of a lens assembly in accordance with a fifth embodiment of the invention. The lens assembly 5 includes a first lens L51, a stop ST5, a second lens L52, a third lens L53, a fourth lens L54, a fifth lens L55 and an Optical filter OF5, all of which are arranged in sequence from an object side to an image side along an optical axis OA5. In operation, an image of light rays from the object side is formed at an image plane IMA5. The first lens L51 is made of plastic material and with positive refractive power, wherein the object side surface S51 is a convex surface, the image side surface S52 is a convex surface and both of the object side surface S51 and image side surface S52 are aspheric surfaces. The second lens L52 is made of plastic material and with negative refractive power, wherein the object side surface S54 is a convex surface, the image side surface S55 is a concave surface and both of the object side surface S54 and image side surface S55 are aspheric surfaces. The third lens L53 is made of plastic material and with positive refractive power, wherein the object side surface S56 is a convex surface, the image side surface S57 is a convex surface and both of the object side surface S56 and image side surface S57 are aspheric surfaces. The fourth lens L54 is made of plastic material and with positive refractive power, wherein the object side surface S58 is a concave surface, the image side surface S59 is a convex surface and both of the object side surface S58 and image side surface S59 are aspheric surfaces. The fifth lens L55 is made of plastic material and with negative refractive power, wherein around the optical axis OA5 of the object side surface S510 is a convex surface, around the optical axis OA5 of the image side surface S511 is a concave surface and both of the object side surface S510 and image side surface S511 are aspheric surfaces. Both of the object side surface S512 and image side surface S513 of the optical filter OF5 are plane surfaces. The first lens L51 and the third lens L53 are made of the same material and with the same Abbe number. The Abbe number of the first lens L51, the third lens L53 and the fifth lens L55 are greater than the Abbe number of the second lens L52.

In order to maintain excellent optical performance of the lens assembly in accordance with the fifth embodiment of the invention, the lens assembly 5 must satisfies the following seven conditions:

$0.73 \leq f5/TTL5 \leq 0.80$ (29)

$-2.5 \leq (R5_{11}-R5_{12})/(R5_{11}+R5_{12}) \leq -1.9$ (30)

$0.4 \leq (R5_{21}-R5_{22})/(R5_{21}+R5_{22}) \leq 0.5$ (31)

$-1.2 \leq f5_2/f5 \leq -1.0$ (32)

$-14.0 \leq (R5_{31}-R5_{32})/(R5_{31}+R5_{32}) \leq -2.4$ (33)

$2.2 \leq f5_3/f5 \leq 2.7$ (34)

$0.65 \leq f5_4/f5 \leq 0.7$ (35)

wherein f5 is an effective focal length of the lens assembly 5, TTL5 is a distance from the object side surface S51 of the first lens L51 to the image plane IMA5 along the optical axis OA5, $R5_{11}$ is a radius of curvature of the object side surface S51 of the first lens L51, $R5_{12}$ is a radius of curvature of the image side surface S52 of the first lens L51, $R5_{21}$ is a radius of curvature of the object side surface S54 of the second lens L52, $R5_{22}$ is a radius of curvature of the image side surface S55 of the second lens L52, $f5_2$ is an effective focal length of the second lens L52, $R5_{31}$ is a radius of curvature of the object side surface S56 of the third lens L53, $R5_{32}$ is a radius of curvature of the image side surface S57 of the third lens L53, $f5_3$ is an effective focal length of the third lens L53, and $f5_4$ is an effective focal length of the fourth lens L54.

By the above design of the lenses and stop ST5, the lens assembly 5 is provided with a shortened total lens length, an effective corrected aberration and an increased resolution.

In order to achieve the above purposes and effectively enhance the optical performance, the lens assembly 5 in accordance with the fifth embodiment of the invention is provided with the optical specifications shown in Table 9, which include the effective focal length, F-number, field of view, total lens length, radius of curvature of each lens surface, thickness between adjacent surface, refractive index of each lens and Abbe number of each lens. Table 9 shows that the effective focal length is equal to 2.594 mm, F-number is equal to 2.2, field of view is equal to 81.9° and total lens length is equal to 3.400 mm for the lens assembly 5 of the fifth embodiment of the invention.

TABLE 9

Effective Focal Length = 2.594 mm F-number = 2.2
Field of View = 81.9° Total Lens Length = 3.400 mm

| Surface Number | Radius of Curvature (mm) | Thickness (mm) | Nd | Vd | Remark |
|---|---|---|---|---|---|
| S51 | 1.6260 | 0.3477 | 1.544 | 56.1 | The First Lens L51 |
| S52 | −3.9940 | 0.0200 | | | |
| S53 | ∞ | 0.0200 | | | Stop ST5 |
| S54 | 3.1058 | 0.2000 | 1.636 | 23.9 | The Second Lens L52 |
| S55 | 1.1588 | 0.2669 | | | |
| S56 | 6.4798 | 0.3011 | 1.544 | 56.1 | The Third Lens L53 |
| S57 | −8.6534 | 0.4151 | | | |
| S58 | −2.6060 | 0.4632 | 1.544 | 56.1 | The Fourth Lens L54 |
| S59 | −0.7281 | 0.2598 | | | |
| S510 | 24.6712 | 0.2771 | 1.582 | 30.2 | The Fifth Lens L55 |
| S511 | 0.8041 | 0.3785 | | | |
| S512 | ∞ | 0.2100 | 1.517 | 64.2 | Optical Filter OF5 |
| S513 | ∞ | 0.2405 | | | |

The aspheric surface sag z of each lens in table 9 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the fifth embodiment, the conic constant k and the aspheric coefficients A, B, C, D, E, F, G of each surface are shown in Table 10.

TABLE 10

| Surface Number | k | A | B | C | D | E | F | G |
|---|---|---|---|---|---|---|---|---|
| S51 | −5.9438E−01 | −2.4484E−02 | −9.2674E−02 | 2.5178E−01 | −1.2129E−01 | −1.4230E+00 | 9.5055E−01 | 6.2292E−01 |
| S52 | −1.0733E+01 | 1.2247E−01 | 4.9333E−02 | −7.4480E−01 | 3.6744E−01 | 0.0000E+00 | 0.0000E+00 | 0.0000E+00 |
| S54 | −6.9812E+01 | 3.0512E−02 | 7.0926E−02 | −2.6557E+00 | 2.6078E+00 | −3.6613E−01 | 0.0000E+00 | 0.0000E+00 |
| S55 | −7.0797E+00 | 3.5603E−02 | 5.8922E−01 | −1.5388E+00 | 6.1206E−01 | 2.0862E+00 | −3.0173E+00 | 1.1085E+00 |
| S56 | −6.9861E+01 | −1.6305E−01 | 1.5945E−01 | −5.8372E−02 | 3.0528E−01 | 7.0426E−01 | −7.3770E−01 | −1.2436E−01 |
| S57 | 1.0024E+01 | −1.4375E−01 | 1.9752E−01 | −2.0088E−01 | 2.4773E−01 | 5.1998E−01 | −7.0942E−01 | 8.5440E−01 |
| S58 | 0.0000E+00 | 1.2159E−02 | −4.0585E−03 | 8.4626E−02 | −1.9031E−01 | −7.0072E−03 | 9.7479E−02 | −2.1318E−02 |
| S59 | −3.7007E+00 | −1.8714E−01 | 3.4047E−01 | −1.8530E−01 | 7.3434E−03 | 2.9942E−02 | −2.9071E−03 | −4.6799E−03 |
| S510 | 6.3334E+01 | −1.4783E−01 | 4.1422E−02 | 3.3590E−03 | −1.7533E−03 | −8.4807E−05 | 1.0408E−04 | −2.4697E−05 |
| S511 | −6.3354E+00 | −1.2611E−01 | 5.6202E−02 | −2.0779E−02 | 3.5712E−03 | −1.7621E−04 | −7.4918E−06 | −6.3471E−08 |

For the lens assembly 5 of the fifth embodiment, the Abbe number of the first lens L51 and the third lens L53 are equal to 56.1, the Abbe number of the fifth lens L55 is equal to 30.2, the Abbe number of the second lens L52 is equal to 23.9, the effective focal length f5 of the lens assembly 5 is equal to 2.594 mm, the distance TTL5 from the object side surface S51 of the first lens L51 to the image plane IMA5 along the optical axis OA5 is equal to 3.400 mm, the radius of curvature $R5_{11}$ of the object side surface S51 of the first lens L51 is equal to 1.62604 mm, the radius of curvature $R5_{12}$ of the image side surface S52 of the first lens L51 is equal to −3.99399 mm, the radius of curvature $R5_{21}$ of the object side surface S54 of the second lens L52 is equal to 3.10580 mm, the radius of curvature $R5_{22}$ of the image side surface S55 of the second lens L52 is equal to 1.15884 mm, the effective focal length $f5_2$ of the second lens L52 is equal to −3.00803 mm, the radius of curvature $R5_{31}$ of the object side surface S56 of the third lens L53 is equal to 6.47980 mm, the radius of curvature $R5_{32}$ of the image side surface S57 of the third lens L53 is equal to −8.65335 mm, the effective focal length $f5_3$ of the third lens L53 is equal to 6.83494 mm, and the effective focal length $f5_4$ of the fourth lens L54 is equal to 1.70254 mm. According to the above data, the following values can be obtained:

$f5/TTL5=0.7628$, $(R5_{11}-R5_{12})/(R5_{11}+R5_{12})=-2.3734$, $(R5_{21}-R5_{22})/(R5_{21}-R5_{22})=0.4565$, $f5_2/f5=-1.1598$, $(R5_{31}-R5_{32})/(R5_{31}+R5_{32})=-6.9624$, $f5_3/f5=2.6354$, $f5_4/f5=0.6565$ which respectively satisfy the above conditions (29)-(35).

Figure 10A:
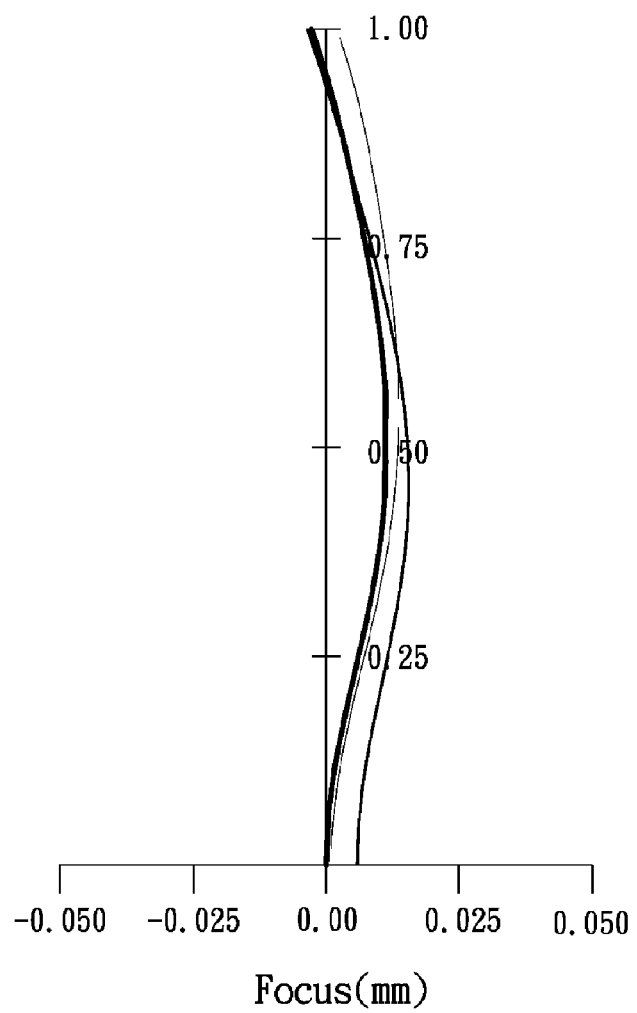
FIG. 10A depicts a longitudinal spherical aberration of the lens assembly in accordance with the fifth embodiment of the invention.
Figure 10B:
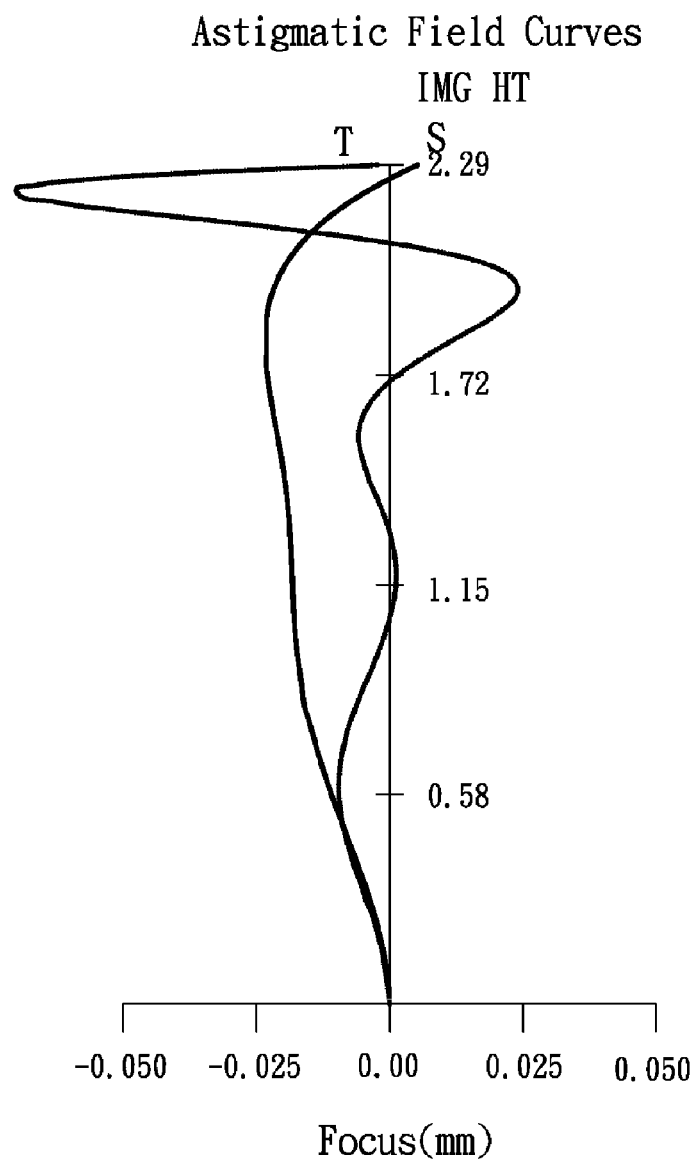
FIG. 10B is an astigmatic field curves diagram of the lens assembly in accordance with the fifth embodiment of the invention.
Figure 10C:
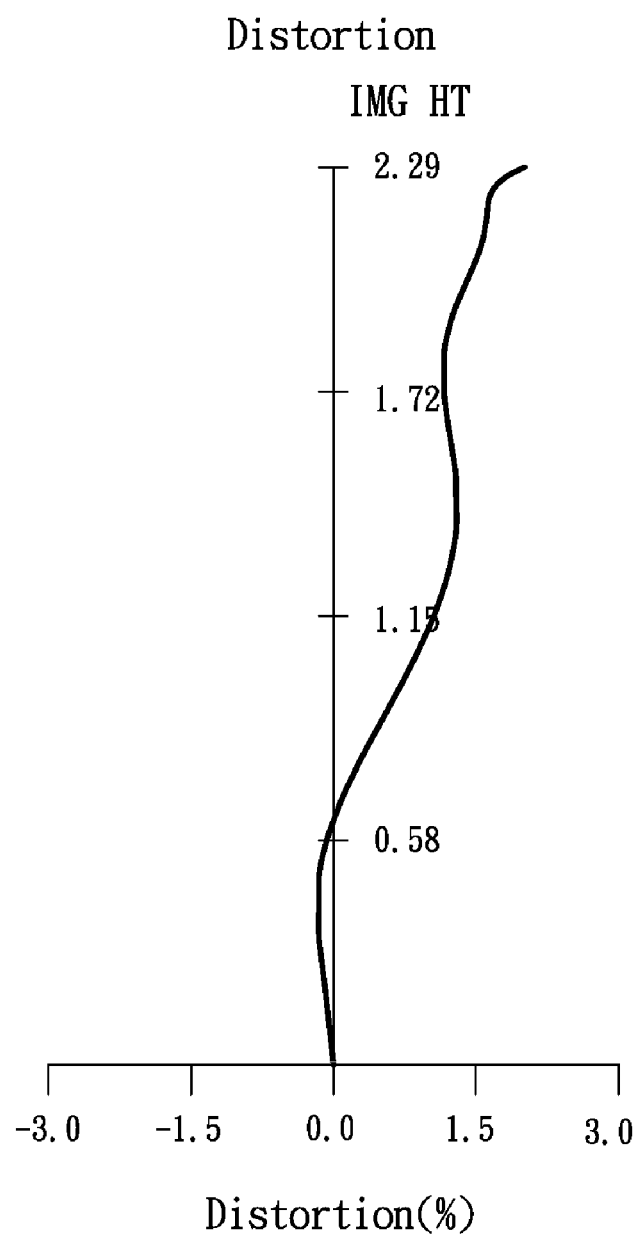
FIG. 10C is a distortion diagram of the lens assembly in accordance with the fifth embodiment of the invention.

By the above arrangements of the lenses and stop ST5, the lens assembly 5 of the fifth embodiment can meet the requirements of optical performance as seen in FIGS. 10A-10C, wherein FIG. 10A shows a longitudinal spherical aberration diagram of the lens assembly 5 in accordance with the fifth embodiment of the invention, FIG. 10B shows an astigmatic field curves of the lens assembly 5 in accordance with the fifth embodiment of the invention and FIG. 10C shows a distortion diagram of the lens assembly 5 in accordance with the fifth embodiment of the invention.

It can be seen from FIG. 10A that the longitudinal spherical aberration in the lens assembly 5 of the fifth embodiment ranges between −0.005 mm and 0.020 mm for the wavelength of 470.0000 nm, 555.0000 nm and 650.0000 nm. It can be seen from FIG. 10B that the astigmatic field curves of tangential direction and sagittal direction in the lens assembly 5 of the fifth embodiment ranges between −0.070 mm and 0.025 mm for the wavelength of 555.0000 nm. It can be seen from FIG. 10C that the distortion in the lens assembly 5 of the fifth embodiment ranges between −0.5% and 2.5% for the wavelength of 555.0000 nm. It is obvious that the longitudinal spherical aberration, the astigmatic field curves and the distortion of the lens assembly 5 of the fifth embodiment can be corrected effectively. Therefore, the lens assembly 5 of the fifth embodiment is capable of good optical performance.

Figure 11:
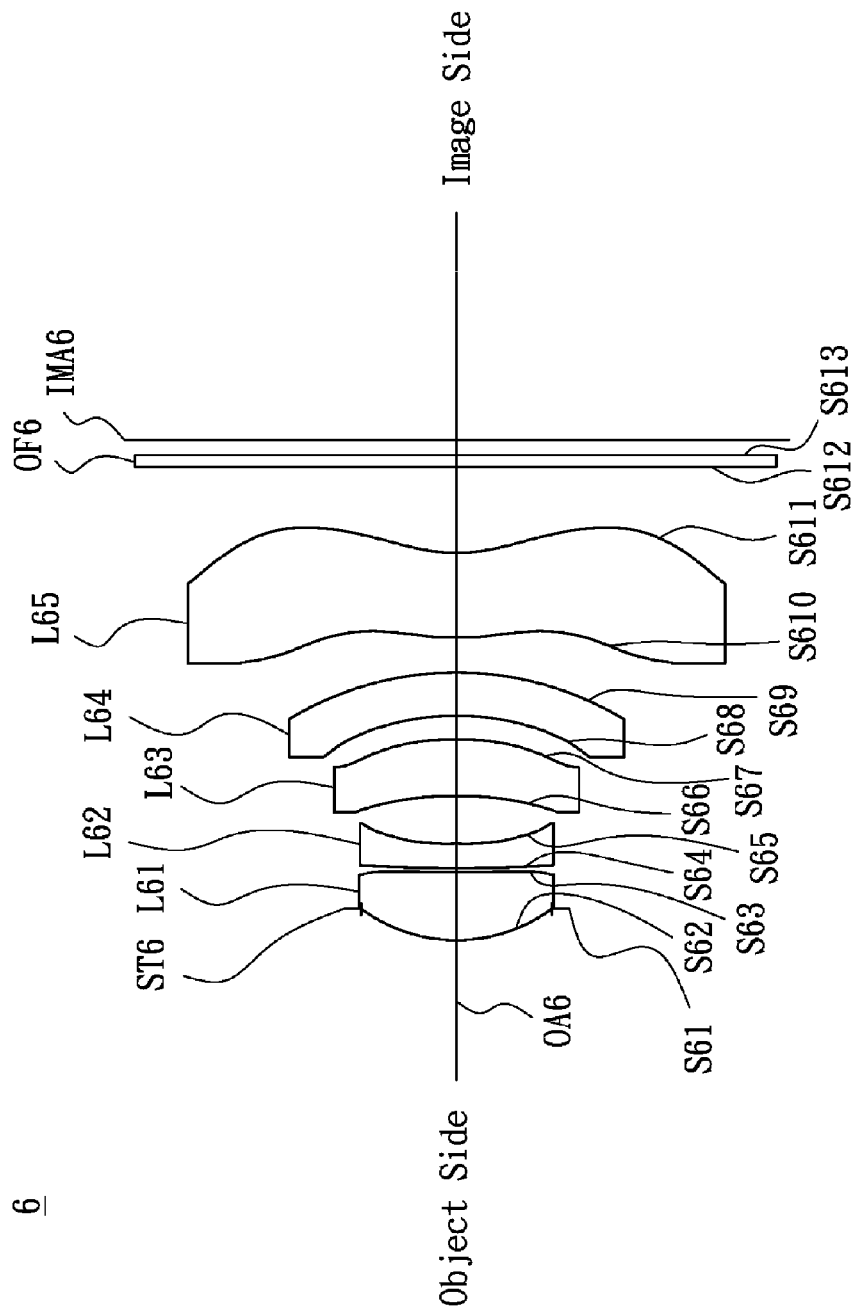
FIG. 11 is a lens layout of a lens assembly in accordance with a sixth embodiment of the invention.

Referring to FIG. 11, FIG. 11 is a lens layout of a lens assembly in accordance with a sixth embodiment of the invention. The lens assembly 6 includes a stop ST6, a first lens L61, a second lens L62, a third lens L63, a fourth lens L64, a fifth lens L65 and an optical filter OF6, all of which are arranged in sequence from an object side to an image side along an optical axis OA6. In operation, an image of light rays from the object side is formed at an image plane IMA6. The first lens L61 is made of plastic material and with positive refractive power, wherein the object side surface S62 is a convex surface, the image side surface S63 is a concave surface and both of the object side surface S62 and image side surface S63 are aspheric surfaces. The second lens L62 is made of plastic material and with negative refractive power, wherein the object side surface S64 is a convex surface, the image side surface S65 is a concave surface and both of the object side surface S64 and image side surface S65 are aspheric surfaces. The third lens L63 is made of plastic material and with positive refractive power, wherein the object side surface S66 is a concave surface, the image side surface S67 is a convex surface and both of the object side surface S66 and image side surface S67 are aspheric surfaces. The fourth lens L64 is made of plastic material and with negative refractive power, wherein the object side surface S68 is a concave surface, the image side surface S69 is a convex surface and both of the object side surface S68 and image side surface S69 are aspheric surfaces. The fifth lens L65 is made of plastic material and with negative refractive power, wherein around the optical axis OA6 of the object side surface S610 is a convex surface, around the optical axis OA6 of the image side surface S611 is a concave surface and both of the object side surface S610 and image side surface S611 are aspheric surfaces. Both of the object side surface S612 and image side surface S613 of the optical filter OF6 are plane surfaces. The first lens L61, the third lens L63 and the fifth lens L65 are made of the same material and with the same Abbe number. The second lens L62 and the fourth lens L64 are made of the same material and with the same Abbe number. The Abbe number of the first lens L61, the third lens L63 and the fifth lens L65 are greater than the Abbe number of the second lens L62 and the fourth lens L64.

TABLE 11

Effective Focal Length = 3.96 mm F-number = 2.2
Field of View = 72.64°

| Surface Number | Radius of Curvature (mm) | Thickness (mm) | Nd | Vd | Remark |
|---|---|---|---|---|---|
| S61 | ∞ | −0.29242 | | | Stop ST6 |
| S62 | 1.457245 | 0.636355 | 1.54 | 56.1 | The First Lens L61 |
| S63 | 15.46302 | 0.02851 | | | |
| S64 | 7.702892 | 0.231781 | 1.64 | 22.4 | The Second Lens L62 |
| S65 | 2.845952 | 0.437582 | | | |
| S66 | −4.73097 | 0.532545 | 1.54 | 56.1 | The Third Lens L63 |
| S67 | −2.39995 | 0.217537 | | | |
| S68 | −1.81418 | 0.405775 | 1.64 | 22.4 | The Fourth Lens L64 |
| S69 | −2.32515 | 0.32109 | | | |
| S610 | 2.292626 | 0.783517 | 1.54 | 56.1 | The Fifth Lens L65 |
| S611 | 1.362169 | 0.8 | | | |
| S612 | ∞ | 0.11 | | | Optical Filter OF6 |
| S613 | ∞ | 0.140592 | | | |

The aspheric surface sag z of each lens in table 11 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14}$$

where c is curvature, h is the vertical distance from the lens surface to the optical axis, k is conic constant and A, B, C, D, E and F are aspheric coefficients.

In the sixth embodiment, the conic constant k and the aspheric coefficients A, B, C, D, E, F of each surface are shown in Table 12.

TABLE 12

| Surface Number | k | A | B | C | D | E | F |
|---|---|---|---|---|---|---|---|
| S62 | 0 | 0.001242248 | 0.05389261 | −0.28350959 | 0.57691471 | −0.52621097 | 0.15550038 |
| S63 | 0 | −0.27944427 | 0.98357698 | −1.9470658 | 2.194504 | −1.4970623 | 0.45562566 |
| S64 | 0 | −0.29086698 | 1.0940118 | −2.0999127 | 2.4089348 | −1.7106964 | 0.5810137 |
| S65 | 7.099412 | −0.078043002 | 0.27907542 | −0.3578625 | 0.26891977 | −0.095882718 | 0.027358474 |
| S66 | 0 | −0.10810429 | −0.025583421 | 0.050079303 | 0.20072383 | −0.26000654 | 0.095679511 |
| S67 | 0 | 0.10079576 | −0.55791414 | 0.8190505 | −0.55430467 | 0.19980003 | −0.027296413 |
| S68 | 0 | 0.46717798 | −1.1372342 | 1.4232078 | −0.97798933 | 0.35113036 | −0.05266029 |
| S69 | −4.4604 | 0.16665129 | −0.37811465 | 0.36512597 | −0.18986105 | 0.052054566 | −0.005925462 |
| S610 | −13.0164 | −0.12445891 | 0.000581694 | 0.017420672 | −0.004745318 | 0.00047323 | −1.44E−05 |
| S611 | −5.82609 | −0.064778946 | 0.01437803 | −0.00301556 | 0.000368916 | −2.33E−05 | 8.11E−07 |

By the above design of the lenses and stop ST6, the lens assembly 6 is provided with a shortened total lens length, an effective corrected aberration and an increased resolution.

In order to achieve the above purposes and effectively enhance the optical performance, the lens assembly 6 in accordance with the sixth embodiment of the invention is provided with the optical specifications shown in Table 11, which include the effective focal length, F-number, field of view, radius of curvature of each lens surface, thickness between adjacent surface, refractive index of each lens and Abbe number of each lens. Table 11 shows that the effective focal length is equal to 3.96 mm, F-number is equal to 2.2 and field of view is equal to 72.6° for the lens assembly 6 of the sixth embodiment of the invention.

For the lens assembly 6 of the sixth embodiment, all of the Abbe number of the first lens L61, the third lens L63 and the fifth lens L65 are equal to 56.1. The Abbe number of the second lens L62 and the fourth lens L64 are equal to 22.4.

Figure 12A:
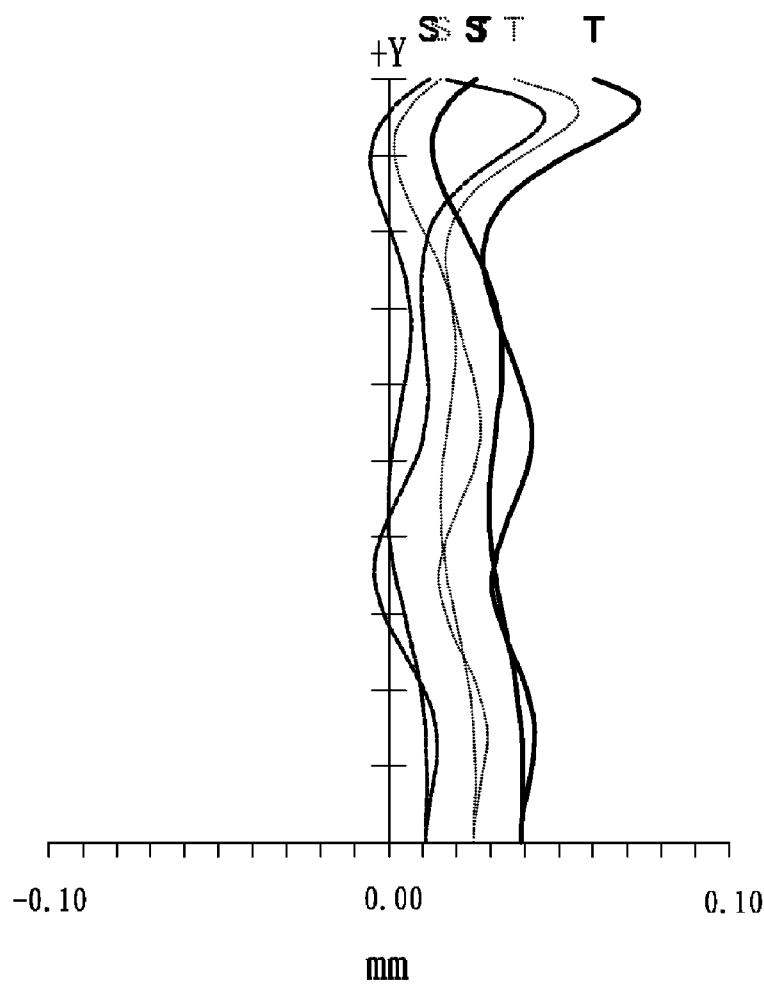
FIG. 12A depicts a field curvature diagram of the lens assembly in accordance with the sixth embodiment of the invention.
Figure 12B:
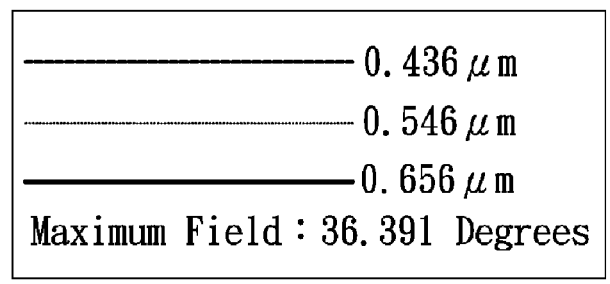
FIG. 12B is a distortion diagram of the lens assembly in accordance with the sixth embodiment of the invention.
Figure 12B:
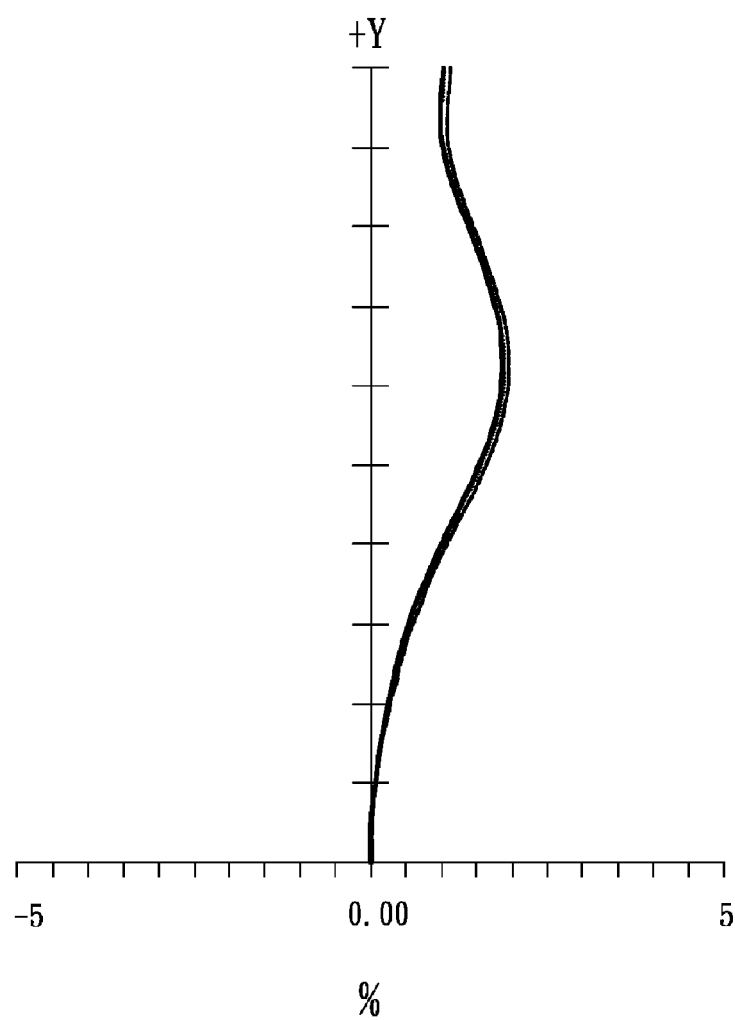
Figure 12C:
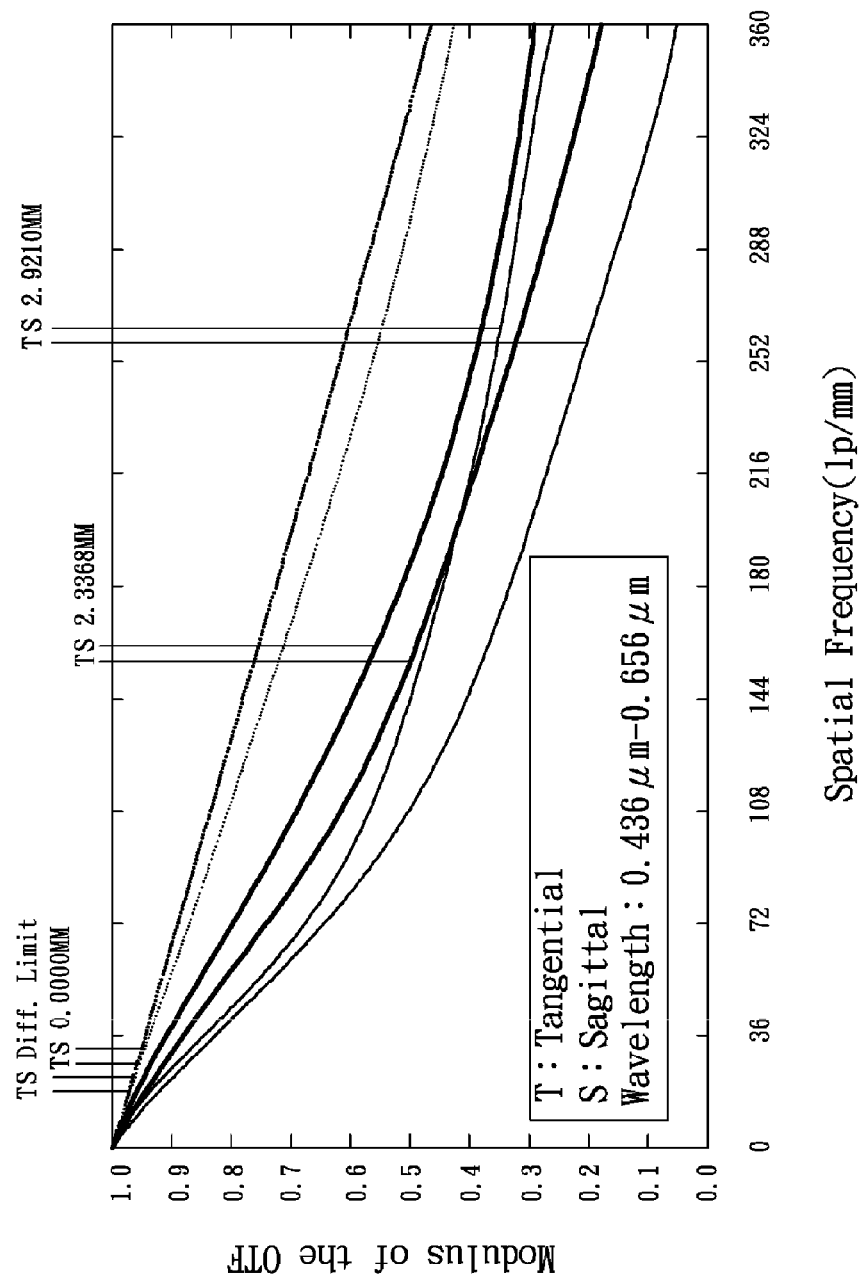
FIG. 12C is a modulation transfer function diagram of the lens assembly in accordance with the sixth embodiment of the invention.

By the above arrangements of the lenses and stop ST6, the lens assembly 6 of the sixth embodiment can meet the requirements of optical performance as seen in FIGS. 12A-12C, wherein FIG. 12A shows a field curvature diagram of the lens assembly 6 in accordance with the sixth embodiment of the invention, FIG. 12B shows a distortion diagram of the lens assembly 6 in accordance with the sixth embodiment of the invention and FIG. 12C shows a modulation transfer function diagram of the lens assembly 6 in accordance with the sixth embodiment of the invention.

It can be seen from FIG. 12A that the field curvature of tangential direction and sagittal direction in the lens assembly 6 of the sixth embodiment ranges between −0.01 mm and 0.08 mm for the wavelength of 0.436 µm, 0.546 µm and 0.656 μm. It can be seen from FIG. 12B (the three lines in the figure almost coincide to appear as if a signal line) that the distortion in the lens assembly 6 of the sixth embodiment ranges between 0% and 2.0% for the wavelength of 0.436 μm, 0.546 μm and 0.656 μm. It can be seen from FIG. 12C that the modulation transfer function of tangential direction and sagittal direction in the lens assembly 6 of the sixth embodiment ranges between 0.05 and 1.0 wherein the wavelength ranges between 0.436 μm and 0.656 μm, each field is 0.0000 mm, 2.3368 mm and 2.9210 mm, spatial frequency ranges between 0 lp/mm and 360 lp/mm. It is obvious that the field curvature and the distortion of the lens assembly 6 of the sixth embodiment can be corrected effectively, the image resolution can meet the requirement. Therefore, the lens assembly 6 of the sixth embodiment is capable of good optical performance.

Figure 13:
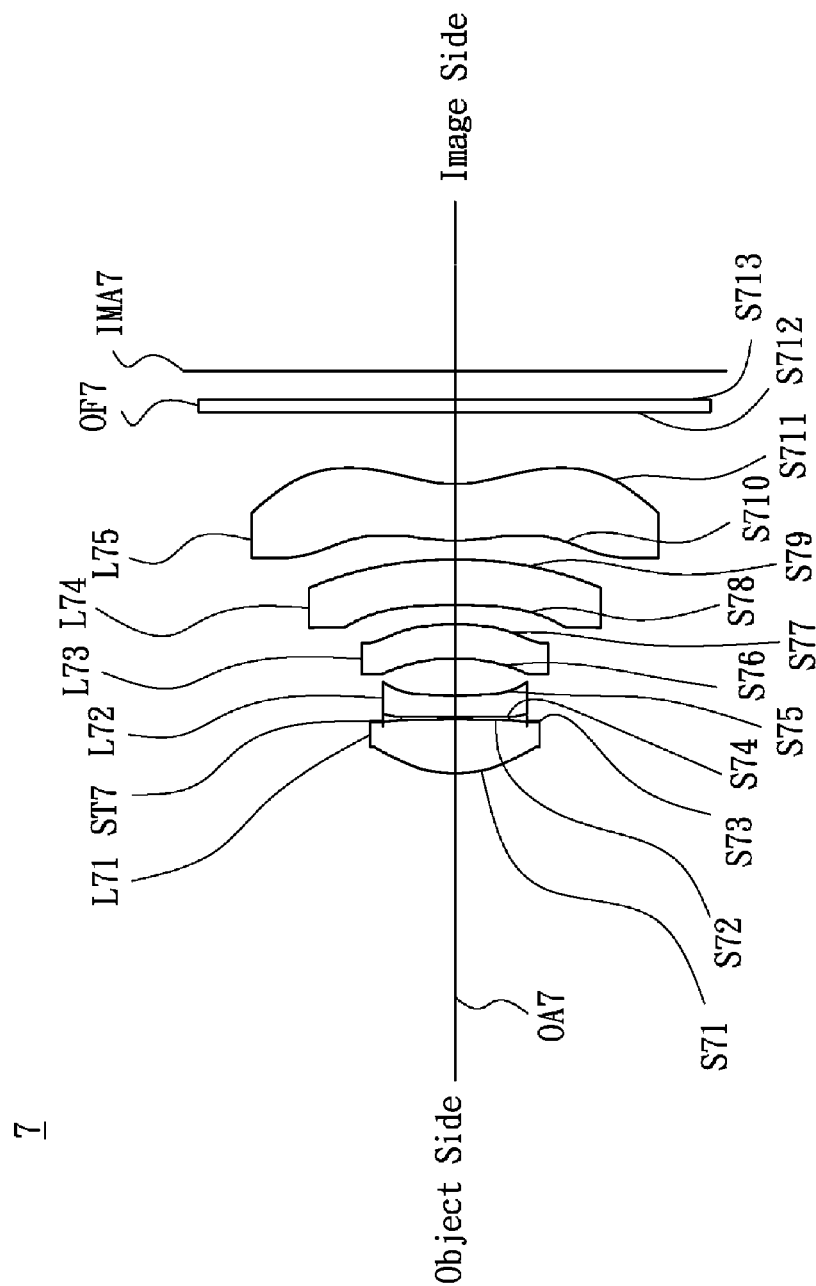
FIG. 13 is a lens layout of a lens assembly in accordance with a seventh embodiment of the invention.

Referring to FIG. 13, FIG. 13 is a lens layout of a lens assembly in accordance with a seventh embodiment of the invention. The lens assembly 7 includes a first lens L71, a stop ST7, a second lens L72, a third lens L73, a fourth lens L74, a fifth lens L75 and an optical filter OF7, all of which are arranged in sequence from an object side to an image side along an optical axis OA7. In operation, an image of light rays from the object side is formed at an image plane IMA7. The first lens L71 is made of plastic material and with positive refractive power, wherein the object side surface S71 is a convex surface, the image side surface S72 is a concave surface and both of the object side surface S71 and image side surface S72 are aspheric surfaces. The second lens L72 is made of plastic material and with negative refractive power, wherein the object side surface S74 is a convex surface, the image side surface S75 is a concave surface and both of the object side surface S74 and image side surface S75 are aspheric surfaces. The third lens L73 is made of plastic material and with positive refractive power, wherein the object side surface S76 is a concave surface, the image side surface S77 is a convex surface and both of the object side surface S76 and image side surface S77 are aspheric surfaces. The fourth lens L74 is made of plastic material and with positive refractive power, wherein the object side surface S78 is a concave surface, the image side surface S79 is a convex surface and both of the object side surface S78 and image side surface S79 are aspheric surfaces. The fifth lens L75 is made of plastic material and with negative refractive power, wherein around the optical axis OA7 of the object side surface S710 is a convex surface, around the optical axis OA7 of the image side surface S711 is a concave surface and both of the object side surface S710 and image side surface S711 are aspheric surfaces. Both of the object side surface S712 and image side surface S713 of the optical filter OF7 are plane surfaces. The first lens L71, the third lens L73 and the fifth lens L75 are made of the same material and with the same Abbe number. The second lens L72 and the fourth lens L74 are made of the same material and with the same Abbe number. The Abbe number of the first lens L71, the third lens L73 and the fifth lens L75 are greater than the Abbe number of the second lens L72 and the fourth lens L74.

By the above design of the lenses and stop ST7, the lens assembly 7 is provided with a shortened total lens length, an effective corrected aberration and an increased resolution.

In order to achieve the above purposes and effectively enhance the optical performance, the lens assembly 7 in accordance with the seventh embodiment of the invention is provided with the optical specifications shown in Table 13, which include the effective focal length, F-number, field of view, radius of curvature of each lens surface, thickness between adjacent surface, refractive index of each lens and Abbe number of each lens. Table 13 shows that the effective focal length is equal to 4.0 mm, F-number is equal to 2.2 and field of view is equal to 72° for the lens assembly 7 of the seventh embodiment of the invention.

TABLE 13

Effective Focal Length = 4.0 mm F-number = 2.2
Field of View = 72°

| Surface Number | Radius of Curvature (mm) | Thickness (mm) | Nd | Vd | Remark |
|---|---|---|---|---|---|
| S71 | 1.352195 | 0.591193 | 1.54 | 56.1 | The First Lens L71 |
| S72 | 15.22481 | −0.03623 | | | |
| S73 | ∞ | 0.06291 | | | Stop ST7 |
| S74 | 12.74745 | 0.225753 | 1.64 | 22.4 | The Second Lens L72 |
| S75 | 3.417657 | 0.406097 | | | |
| S76 | −2.875211 | 0.375047 | 1.54 | 56.1 | The Third Lens L73 |
| S77 | −3.084738 | 0.214297 | | | |
| S78 | −3.840558 | 0.498802 | 1.64 | 22.4 | The Fourth Lens L74 |
| S79 | −3.510155 | 0.202523 | | | |
| S710 | 1.931713 | 0.620281 | 1.54 | 56.1 | The Fifth Lens L75 |
| S711 | 1.254278 | 0.8 | | | |
| S712 | ∞ | 0.11 | | | Optical Filter OF7 |
| S713 | ∞ | 0.345164 | | | |

The aspheric surface sag z of each lens in table 13 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14}$$

where c is curvature, h is the vertical distance from the lens surface to the optical axis, k is conic constant and A, B, C, D, E and F are aspheric coefficients.

In the seventh embodiment, the conic constant k and the aspheric coefficients A, B, C, D, E, F of each surface are shown in Table 14.

TABLE 14

| Surface Number | k | A | B | C | D | E | F |
|---|---|---|---|---|---|---|---|
| S71 | 0 | −0.002162446 | −0.027987549 | −0.031561893 | 0.015832565 | −0.11070404 | 0 |
| S72 | 0 | −0.38817305 | 1.0025926 | −1.5980951 | 1.2549801 | −0.45113211 | 0 |
| S74 | 0 | −0.32186583 | 1.1218077 | −1.4715294 | 0.96499891 | 0.073910051 | −0.28786794 |
| S75 | 1.193043 | −0.046807634 | 0.69959589 | −1.4209385 | 1.9684429 | −0.48591872 | −0.44738875 |
| S76 | 0 | −0.14948144 | −0.44204239 | 1.4352584 | −2.122511 | 2.4487579 | −1.1859299 |
| S77 | 0 | −0.019819327 | −0.65211893 | 1.0478878 | −0.65905141 | 0.41967197 | −0.17994037 |
| S78 | 0 | 0.40826218 | −1.2537292 | 1.5937167 | −1.0926347 | 0.39971658 | −0.062384989 |
| S79 | −8.01318 | 0.21665301 | −0.44621927 | 0.38302612 | −0.17303755 | 0.041169731 | −0.00415577 |
| S710 | −6.29369 | −0.20777318 | 0.042393504 | 0.011692774 | −0.005166572 | 0.000581451 | −1.46E−05 |
| S711 | −5.87268 | −0.11099071 | 0.03141076 | −0.005709843 | 0.000377232 | 4.23E−07 | 1.78E−06 |

For the lens assembly 7 of the seventh embodiment, all of the Abbe number of the first lens L71, the third lens L73 and the fifth lens L75 are equal to 56.1. The Abbe number of the second lens L72 and the fourth lens L74 are equal to 22.4.

Figure 14A:
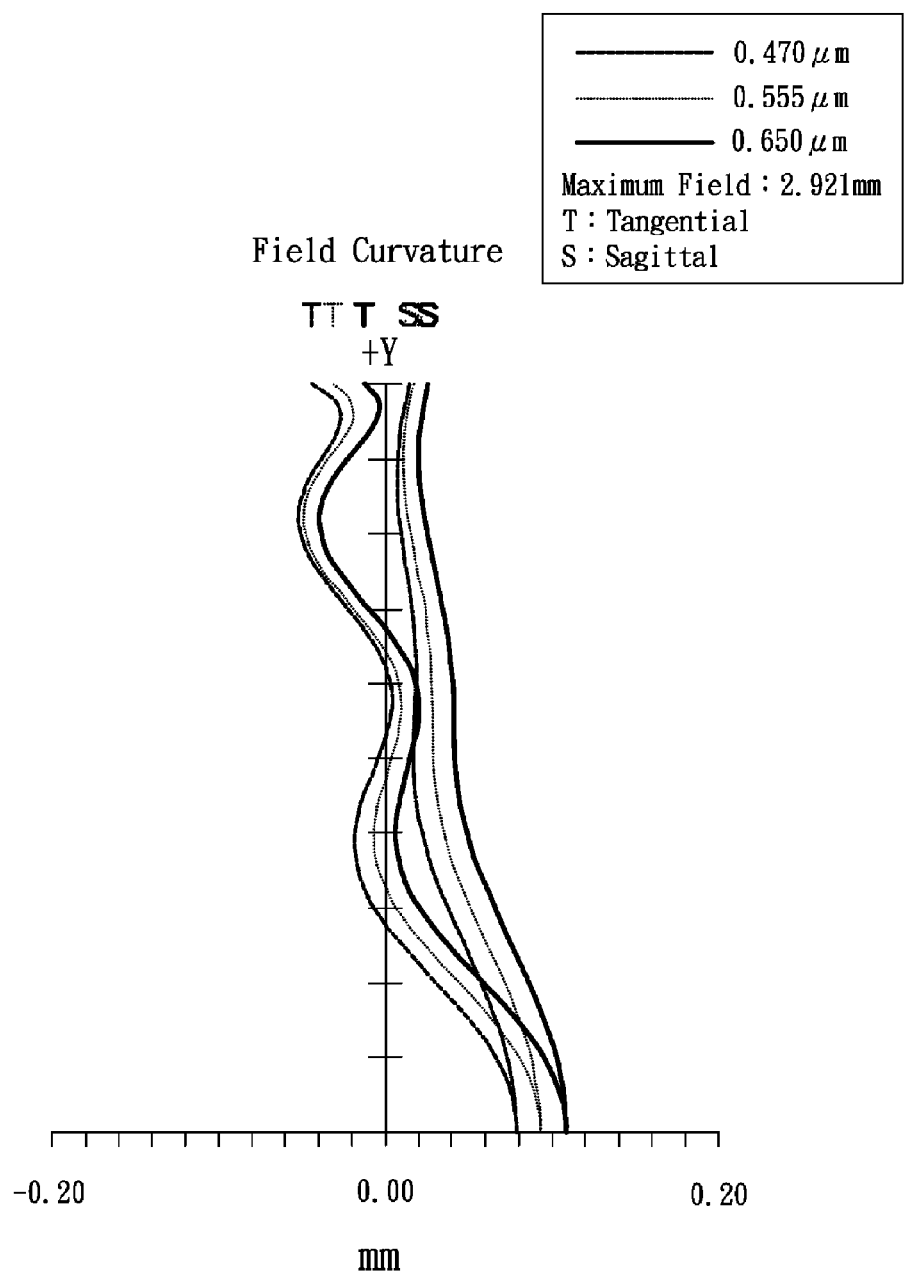
FIG. 14A depicts a field curvature diagram of the lens assembly in accordance with the seventh embodiment of the invention.
Figure 14B:
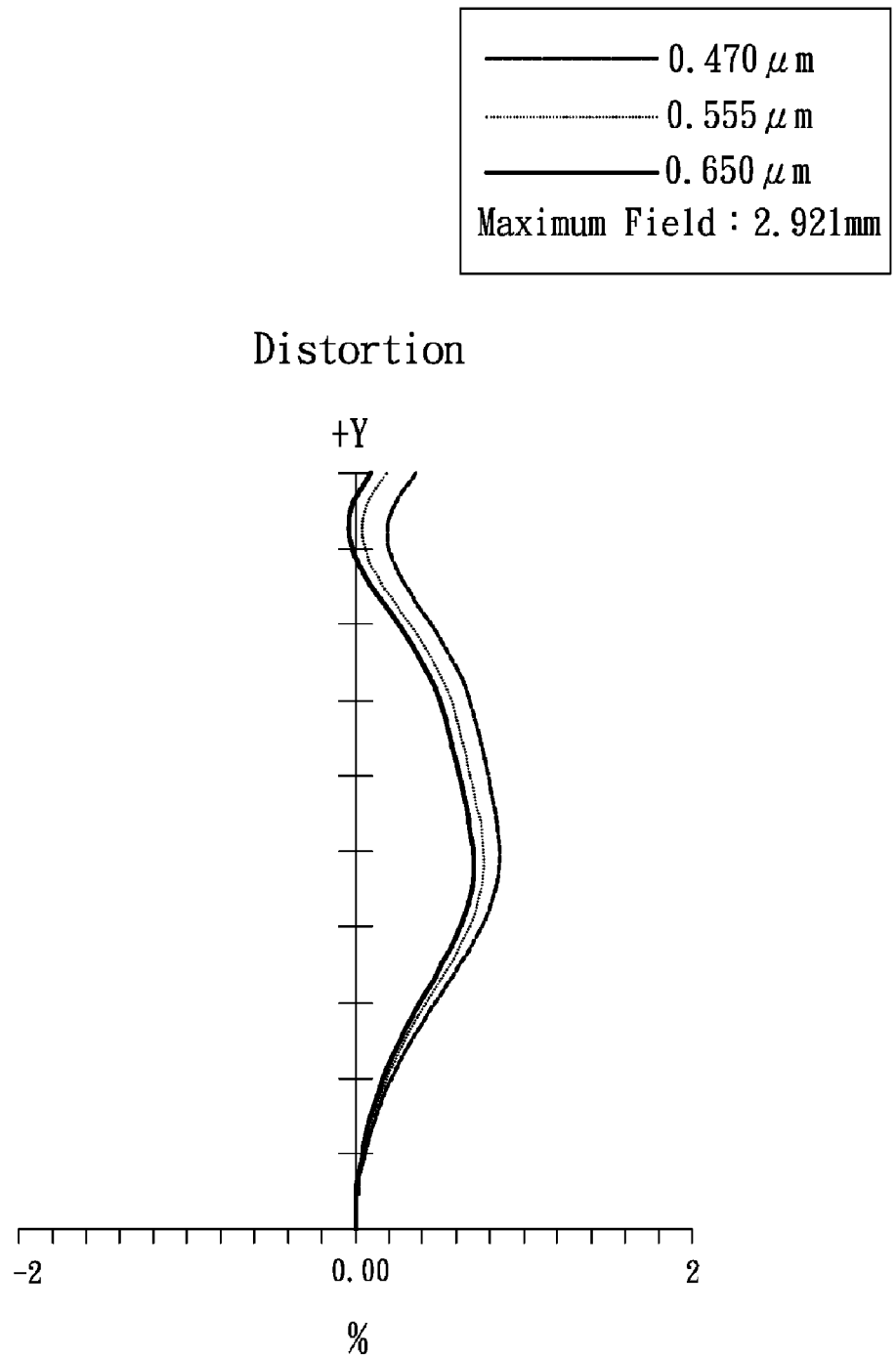
FIG. 14B is a distortion diagram of the lens assembly in accordance with the seventh embodiment of the invention.
Figure 14C:
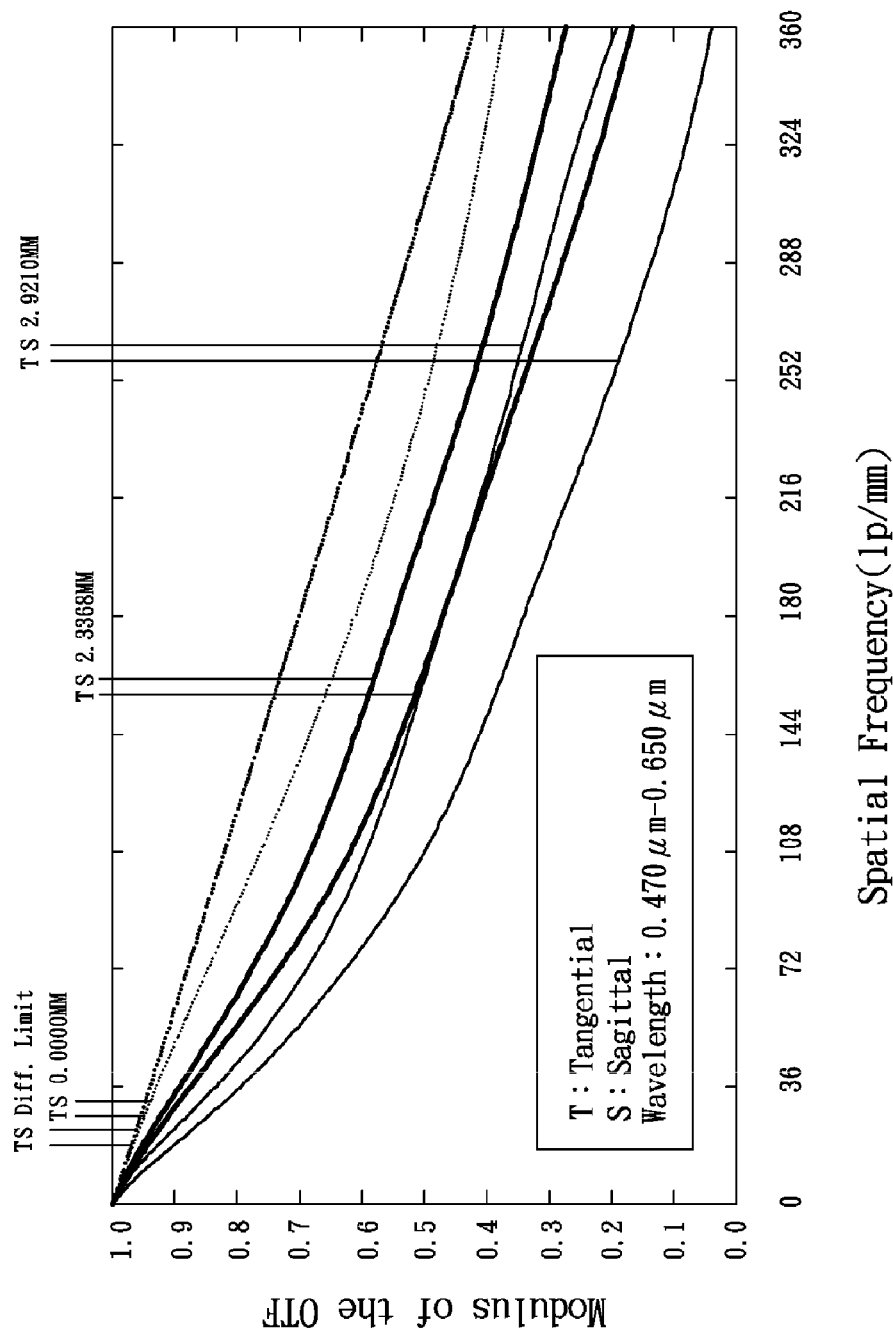
FIG. 14C is a modulation transfer function diagram of the lens assembly in accordance with the seventh embodiment of the invention.

By the above arrangements of the lenses and stop ST7, the lens assembly 7 of the seventh embodiment can meet the requirements of optical performance as seen in FIGS. 14A-14C, wherein FIG. 14A shows a field curvature diagram of the lens assembly 7 in accordance with the seventh embodiment of the invention, FIG. 14B shows a distortion diagram of the lens assembly 7 in accordance with the seventh embodiment of the invention and FIG. 14C shows a modulation transfer function diagram of the lens assembly 7 in accordance with the seventh embodiment of the invention.

It can be seen from FIG. 14A that the field curvature of tangential direction and sagittal direction in the lens assembly 7 of the seventh embodiment ranges between −0.06 mm and 0.12 mm for the wavelength of 0.470 μm and 0.650 μm. It can be seen from FIG. 14B that the distortion in the lens assembly 7 of the seventh embodiment ranges between 0% and 1.0% for the wavelength of 0.470 μm, 0.555 μm and 0.650 μm. It can be seen from FIG. 14C that the modulation transfer function of tangential direction and sagittal direction in the lens assembly 7 of the seventh embodiment ranges between 0.03 and 1.0 wherein the wavelength ranges between 0.470 μm and 0.650 μm, each field is 0.0000 mm, 2.3368 mm and 2.9210 mm, spatial frequency ranges between 0 lp/mm and 360 lp/mm. It is obvious that the field curvature and the distortion of the lens assembly 7 of the seventh embodiment can be corrected effectively, the image resolution can meet the requirement. Therefore, the lens assembly 7 of the seventh embodiment is capable of good optical performance.

In the above first, second, third, fourth, fifth, sixth and seventh embodiments, both of the object side surface and image side surface of the first, second, third, fourth and fifth lens are aspheric surfaces. However, it has the same effect and falls into the scope of the invention that any of the object side surfaces or image side surfaces of the first, second, third, fourth and fifth lens are changed into spherical surfaces.

What is claimed is:

1. A lens assembly comprising a first lens, a second lens, a third lens, a fourth lens and a fifth lens, all of which are arranged in sequence from an object side to an image side along an optical axis, wherein:
the first lens is with positive refractive power and comprises a concave surface facing the image side;
the second lens is with negative refractive power and comprises a convex surface facing the object side;
the third lens is with positive refractive power and comprises a concave surface facing the object side;
the fourth lens is a meniscus lens with negative refractive power and comprises a concave surface facing the object side and a convex surface facing the image side;
the fifth lens is with negative refractive power and comprises a concave surface facing the image side;
the first lens and the third lens are made of the same material and an Abbe number of the first lens is the same as an Abbe number of the third lens;
an Abbe number of the first lens, an Abbe number of the third lens and an Abbe number of the fifth lens are greater than an Abbe number of the second lens; and
the second lens and the fourth lens are made of the same material and an Abbe number of the second lens is the same as an Abbe number of the fourth lens.

2. The lens assembly as claimed in claim 1, wherein:
the first lens, the third lens and the fifth lens are made of the same material and an Abbe number of the first lens, an Abbe number of the third lens and an Abbe number of the fifth lens are the same; and
an Abbe number of the first lens, an Abbe number of the third lens and an Abbe number of the fifth lens are greater than an Abbe number of the second lens and an Abbe number of the fourth lens.

3. The lens assembly as claimed in claim 1, wherein the first lens, the second lens, the third lens, the fourth lens and the fifth lens are made of plastic material.

4. The lens assembly as claimed in claim 1, further comprising a stop disposed between the object side and the second lens.

5. The lens assembly as claimed in claim 1, wherein:
the first lens comprises two surfaces, at least one of which is an aspheric surface or both of which are aspheric surfaces;
the second lens comprises two surfaces, at least one of which is an aspheric surface or both of which are aspheric surfaces;
the third lens further comprises a surface, wherein the surface is an aspheric surface, or the concave surface of the third lens is an aspheric surface, or both of the surface and the concave surface of the third lens are aspheric surfaces;
the fourth lens comprises two surfaces, at least one of which is an aspheric surface or both of aspheric surfaces; and
the fifth lens further comprises a surface, wherein the surface is an aspheric surface, or the concave surface of the fifth lens is an aspheric surface, or both of the surface and the concave surface of the fifth lens are aspheric surfaces.

6. A lens assembly comprising a first lens, a second lens, a third lens, a fourth lens and a fifth lens, all of which are arranged in sequence from an object side to an image side along an optical axis, wherein:
the first lens is with positive refractive power and comprises a concave surface facing the image side;
the second lens is with negative refractive power and comprises a convex surface facing the object side;
the third lens is with positive refractive power;
the fourth lens is a meniscus lens with negative refractive power and comprises a concave surface facing the object side and a convex surface facing the image side;
the fifth lens is with negative refractive power and comprises a concave surface facing the image side;
the first lens and the third lens are made of the same material and an Abbe number of the first lens is the same as an Abbe number of the third lens; the third lens satisfies:

$$2.2 \leq f_3/f \leq 2.7$$

wherein $f_3$ is an effective focal length of the third lens and f is an effective focal length of the lens assembly; and
the second lens and the fourth lens are made of the same material and an Abbe number of the second lens is the same as an Abbe number of the fourth lens.

7. The lens assembly as claimed in claim 1, wherein:
the first lens is a meniscus lens and further comprises a convex surface facing the object side;
the second lens is a meniscus lens and further comprises a concave surface facing the image side;
the third lens is a meniscus lens and comprises a convex surface facing the image side; and the fifth lens comprises a convex surface facing the object side.

8. The lens assembly as claimed in claim 1, wherein the second lens satisfies:

$$0.4 \leq (R_{21}-R_{22})/(R_{21}+R_{22}) \leq 0.5,$$

wherein $R_{21}$ is a radius of curvature of the convex surface of the object side of the second lens and $R_{22}$ is a radius of curvature of the concave surface of the image side of the second lens.

9. The lens assembly as claimed in claim 1, wherein the third lens satisfies:

$$2.2 \leq f_3/f \leq 2.7$$

wherein $f_3$ is an effective focal length of the third lens and f is an effective focal length of the lens assembly.

10. The lens assembly as claimed in claim 6, wherein the first lens is a meniscus lens and further comprises a convex surface facing the object side.

11. The lens assembly as claimed in claim 6, wherein the second lens is a meniscus lens and further comprises a concave surface facing the image side.

12. The lens assembly as claimed in claim 6, wherein the third lens is a meniscus lens and comprises a concave surface facing the object side and a convex surface facing the image side.

13. The lens assembly as claimed in claim 6, wherein the fifth lens comprises a convex surface facing the object side.

14. A lens assembly comprising a stop, a first lens, a second lens, a third lens, a fourth lens and a fifth lens, all of which are arranged in sequence from an object side to an image side along an optical axis, wherein:
the first lens is with positive refractive power and comprises a concave surface facing the image side;
the second lens is with negative refractive power and comprises a convex surface facing the object side;
the third lens is with positive refractive power;
the fourth lens is a meniscus lens with negative refractive power and comprises a concave surface facing the object side and a convex surface facing the image side;
the fifth lens is with negative refractive power and comprises a concave surface facing the image side;
the stop disposed between the object side and the first lens; and
the second lens and the fourth lens are made of the same material and an Abbe number of the second lens is the same as an Abbe number of the fourth lens.

15. The lens assembly as claimed in claim 14, wherein the third lens satisfies:

$$2.2 \leq f_3/f \leq 2.7$$

wherein $f_3$ is an effective focal length of the third lens and f is an effective focal length of the lens assembly.

16. The lens assembly as claimed in claim 14, wherein:
the first lens is a meniscus lens and further comprises a convex surface facing the object side;
the second lens is a meniscus lens and further comprises a concave surface facing the image side;
the third lens is a meniscus lens and comprises a concave surface facing the object side and a convex surface facing the image side; and
the fifth lens comprises a convex surface facing the object side.

17. The lens assembly as claimed in claim 14, wherein the second lens satisfies:

$$0.4 \leq (R_{21}-R_{22})/(R_{21}+R_{22}) \leq 0.5,$$

wherein $R_{21}$ is a radius of curvature of the convex surface of the object side of the second lens and $R_{22}$ is a radius of curvature of the concave surface of the image side of the second lens.

* * * * *